US008615487B2

(12) United States Patent (10) Patent No.: US 8,615,487 B2
Gomez et al. (45) Date of Patent: Dec. 24, 2013

(54) SYSTEM AND METHOD TO STORE AND RETRIEVE IDENTIFIER ASSOCIATED INFORMATION CONTENT

(76) Inventors: Garrison Gomez, Marietta, NY (US); Thomas A. Siegler, Charlotte, NC (US); Robert M. Soule, III, Harrisburg, NC (US); Nick Daddabbo, Auburn, NY (US); David Sperduti, Auburn, NY (US)

( * ) Notice: Subject to any disclaimer, the term of this patent is extended or adjusted under 35 U.S.C. 154(b) by 2804 days.

(21) Appl. No.: 10/852,596

(22) Filed: May 24, 2004

(65) Prior Publication Data

US 2005/0165784 A1    Jul. 28, 2005

Related U.S. Application Data

(60) Provisional application No. 60/538,958, filed on Jan. 23, 2004.

(51) Int. Cl.
*G06F 7/00* (2006.01)
*G06F 17/00* (2006.01)

(52) U.S. Cl.
USPC ............ 707/612; 707/621; 707/624; 707/625

(58) Field of Classification Search
USPC ................................. 707/1; 186/61
See application file for complete search history.

(56) References Cited

U.S. PATENT DOCUMENTS

| | | |
|---|---|---|
| 3,792,437 A | 2/1974 | Blumenthal et al. |
| 3,959,624 A | 5/1976 | Kaslow |
| 4,002,886 A | 1/1977 | Sundelin |
| 4,359,631 A | 11/1982 | Lockwood et al. |
| 4,554,446 A | 11/1985 | Murphy et al. |
| 4,575,623 A | 3/1986 | Cononi et al. |
| 4,654,482 A | 3/1987 | DeAngelis |
| 4,674,041 A | 6/1987 | Lemon et al. |
| 4,676,343 A | 6/1987 | Humble et al. |

(Continued)

FOREIGN PATENT DOCUMENTS

| EP | 1028386 A3 | 8/2000 |
|---|---|---|
| EP | 1033656 A1 | 9/2000 |

(Continued)

OTHER PUBLICATIONS www.barpoint.com, Fast Facts, Website, Mar. 14, 2003, pp. 1-3.

(Continued)

*Primary Examiner* — Mariela Reyes
(74) *Attorney, Agent, or Firm* — Additon, Higgins, Pendleton & Ashe, P.A.

(57) ABSTRACT

In one embodiment, information content files, such as text files, image files, XML files and the like, that provide information related to an identifier bearing item, such as a consumer item with a barcode, are stored on a data storage device such as network server. Identifier data entries, such as UPC data, are associated with file data entries, such as file names, in a database. General file access information that is used in accessing the information content files is stored on a terminal. In operation an identifier is read by the terminal and is used to extract one of the file data entries from the database based on database communication information stored on the terminal. The file data entry in combination with the general file access information is used to establish communication with the data storage device and to extract one of the information content files.

57 Claims, 13 Drawing Sheets

(56) References Cited

U.S. PATENT DOCUMENTS

| | | |
|---|---|---|
| 4,703,423 A | 10/1987 | Bado et al. |
| 4,825,045 A | 4/1989 | Humble |
| 9,821,186 | 4/1989 | Munakata at al. |
| 4,833,308 A | 5/1989 | Humble |
| 4,959,530 A | 9/1990 | O'Connor |
| 5,198,644 A | 3/1993 | Pfeiffer et al. |
| 5,361,871 A * | 11/1994 | Gupta et al. .................. 186/61 |
| 5,463,209 A | 10/1995 | Figh et al. |
| 5,632,010 A | 5/1997 | Briechle et al. |
| 5,640,193 A | 6/1997 | Wellner |
| 5,642,484 A | 6/1997 | Harrison, III et al. |
| 5,664,110 A | 9/1997 | Green et al. |
| 5,687,322 A | 11/1997 | Deaton et al. |
| 5,804,803 A | 9/1998 | Cragun et al. |
| 5,806,071 A | 9/1998 | Balderrama et al. |
| 5,890,135 A | 3/1999 | Powell |
| 5,905,248 A | 5/1999 | Russell et al. |
| 5,905,251 A | 5/1999 | Knowles |
| 5,913,210 A | 6/1999 | Call |
| 5,918,214 A | 6/1999 | Perkowski |
| 5,932,863 A | 8/1999 | Rathus et al. |
| 5,932,869 A | 8/1999 | Gottlich et al. |
| 5,933,829 A | 8/1999 | Durst et al. |
| 5,940,595 A | 8/1999 | Reber et al. |
| 5,950,173 A | 9/1999 | Perkowski |
| 5,971,277 A | 10/1999 | Cragun et al. |
| 5,978,773 A | 11/1999 | Hudetz et al. |
| 5,979,757 A | 11/1999 | Tracy et al. |
| 5,995,105 A | 11/1999 | Reber et al. |
| 5,995,888 A | 11/1999 | Hugenbuch |
| 6,012,102 A | 1/2000 | Shachar |
| 6,027,024 A | 2/2000 | Knowles |
| 6,045,048 A | 4/2000 | Wilz, Sr. et al. |
| 6,064,979 A | 5/2000 | Perkowski |
| 6,068,188 A | 5/2000 | Knowles |
| 6,076,070 A | 6/2000 | Stack |
| 6,076,071 A | 6/2000 | Freeny, Jr. |
| 6,108,656 A | 8/2000 | Durst et al. |
| 6,134,548 A | 10/2000 | Gottsman et al. |
| 6,154,738 A | 11/2000 | Call |
| 6,189,790 B1 | 2/2001 | Walter |
| 6,199,048 B1 | 3/2001 | Hundetz et al. |
| 6,213,394 B1 | 4/2001 | Schumacher et al. |
| 6,283,375 B1 * | 9/2001 | Wilz et al. ................ 235/462.45 |
| 6,292,786 B1 | 9/2001 | Deaton et al. |
| 6,321,992 B1 | 11/2001 | Knowles et al. |
| 6,338,067 B1 | 1/2002 | Baker et al. |
| 6,397,193 B1 | 5/2002 | Walker et al. |
| 6,401,074 B1 | 6/2002 | Sleeper |
| 6,412,699 B1 | 7/2002 | Raussell et al. |
| 6,415,263 B1 | 7/2002 | Doss |
| 6,418,441 B1 | 7/2002 | Call |
| 6,430,554 B1 | 8/2002 | Rothschild |
| 6,434,561 B1 | 8/2002 | Durst, Jr. et al. |
| 6,456,981 B1 | 9/2002 | Dejaegar et al. |
| 6,484,146 B2 | 11/2002 | Day et al. |
| 6,510,997 B1 | 1/2003 | Wilz, Sr. et al. |
| 6,542,933 B1 | 4/2003 | Durst, Jr. et al. |
| 6,564,189 B1 | 5/2003 | Nycz |
| 6,595,417 B2 * | 7/2003 | O'Hagan et al. ............. 235/383 |
| 6,701,369 B1 | 3/2004 | Philyaw |
| 6,745,234 B1 | 6/2004 | Philyaw et al. |
| 6,834,804 B2 | 12/2004 | Rathus et al. |
| 2001/0037266 A1 | 11/2001 | Schroeder |
| 2001/0047428 A1 | 11/2001 | Hunter |
| 2002/0004753 A1 | 1/2002 | Perkowski |
| 2002/0042736 A1 | 4/2002 | Wang et al. |
| 2002/0049607 A1 | 4/2002 | Perkowski |
| 2002/0128859 A1 | 9/2002 | Perkowski |
| 2002/0165931 A1 | 11/2002 | Greer et al. |
| 2002/0169687 A1 | 11/2002 | Perkowski |
| 2002/0179715 A1 * | 12/2002 | Kawai .................... 235/462.13 |
| 2003/0009392 A1 | 1/2003 | Perkowski |

FOREIGN PATENT DOCUMENTS

| | | |
|---|---|---|
| JP | 09-204389 | 8/1997 |
| JP | 10-188140 | 7/2001 |
| JP | 2001-249840 | 9/2001 |
| JP | 2001-350782 | 12/2001 |
| JP | 2002-007429 | 1/2002 |
| JP | 2002-041074 | 2/2002 |
| JP | 2002-041553 | 2/2002 |
| JP | 2002-051488 | 2/2002 |
| JP | 2002-077994 | 3/2002 |
| JP | 2002-108740 | 4/2002 |
| JP | 2002-117372 | 4/2002 |
| JP | 2002-132608 | 5/2002 |
| JP | 2002-183183 | 6/2002 |
| JP | 2002-189653 | 7/2002 |
| JP | 2002-281171 | 9/2002 |
| WO | WO 9806055 | 2/1998 |

OTHER PUBLICATIONS

Business Wire, BarPoint.com Presents Low-Cost Turnkey Wireless Solution for Retailers at NRF Big Show; Mobile Merchant Marketplace—"M3"—Lets Stores Prove the Theory of Retail-Tivity, Newswire; Trade, pp. 1-3.

Business Wire, IEE Selects NetSilicon to Deliver Connectivity for Retail POS Systems, Newswire; Trade, pp. 1-3.

www.idautomation.com, .NET Barcode Forms Control & DLL, Website, pp. 1-4.

www.centauri.com UPC—Internet Image Server System, Website, pp. 1-6.

www.idautomation.com, JavaBeans, Applets & Servlets for Barcoding, Website, pp. 1-8.

www.independentreader.com, How UPC Link Connections Work, Website, pp. 1-2.

\* cited by examiner

SYSTEM AND METHOD TO STORE AND RETRIEVE IDENTIFIER ASSOCIATED INFORMATION CONTENT

CROSS REFERENCE TO RELATED APPLICATIONS

The present application claims the benefit of and priority to U.S. Provisional Patent Application No. 60/538,958 filed Jan. 23, 2004, the disclosure of which is incorporated herein by reference in its entirety.

FIELD OF THE INVENTION

The invention relates generally to systems and methods for storing and retrieving information content associated with an identifier. More particularly the invention relates to configuring systems with a portion of the information required to locate the information content.

BACKGROUND

Transaction and portable data terminals are becoming widespread in use to facilitate commercial transactions and to manage and track inventory and shipped items. One of the functions of these terminals is to store and display information related to indicia bearing items.

For example it is now commonplace that the product name and price of an item being purchased will be displayed to a customer in response to the scanning of the product's barcode. Unfortunately despite the existence of additional product information that could be displayed, current terminals lack an efficient scalable system and method to provide this additional content.

What is needed is a system and method that facilitates the display of product, inventory, shipment, and transaction specific information.

SUMMARY OF THE INVENTION

In one aspect, the invention features a method for storing and retrieving information content related to an identifier bearing item. The method comprises configuring the terminal with general file access information. The general file access information includes at least data storage device connection information. The data storage device contains a plurality of information content files. The method also comprises configuring the terminal with database connection information. The database contains a plurality of identifier data entries and a plurality of file data entries. Each of the plurality of identifier data entries is associated with at least one of the file data entries, and each of the file data entries when combined with the general file access information is capable of being used to access at least one of the plurality of information content files. The method additionally comprises reading an identifier on the identifier bearing item to generate identifier data. The method also comprises transmitting a file data entry request to the database from the terminal. The file data entry request is transmitted based on at least the stored database location information and includes at least the identifier data. Further, the method comprises the terminal receiving from the database a file data entry. In addition, the method comprises formulating an information content file request. The information content file request is based on at least the general file access information and the file data entry.

In one embodiment, an entity separate from a company that provides the identifier bearing item maintains some control over the information content files. In one such embodiment, the control includes developing at least some of the content of the information content files. In another such embodiment, the control includes maintaining the information content files. In a further such embodiment, the control includes developing guidelines for the information content files. In one embodiment, the entity is a retail establishment containing the terminal. In another embodiment, the entity is a content management entity. In a further embodiment, each of a plurality of entities separate from companies providing identifier bearing items maintains some control over some of the information content files.

In various embodiments of the method, the information content file request is a file transfer protocol request or a hypertext transfer protocol request. In additional embodiments of the method, the file data entry request is a file transfer protocol request or a hypertext transfer protocol request. In some embodiments of the method, the terminal is a transaction terminal, a portable data terminal, an information kiosk, a cash register, or a self-checkout terminal. In further embodiments of the method, the information content files are image files, extensible mark-up language files, or text files. In further embodiments of the method, the data storage device connection information comprises a network address or telephony connection information for the data storage device. In another embodiment of the method, the data storage device is located on the terminal. In various embodiments of the method, the identifier is represented by a barcode or stored in a radio frequency identification tag. In an additional embodiment, the method further comprises decoding the identifier. In another embodiment, the general file access information specifies the location of the data storage device and the file data entries specify file paths on the data storage device. In a further embodiment, the general file access information specifies the location of the data storage device and a first file path portion and the file data entries specify second file path portions, the second file path portions including file names. In an additional embodiment, the file data entries are file names.

In another aspect, the invention features a system for storing and retrieving information content related to an identifier bearing item. The system comprises a reader capable of reading an identifier on the identifier bearing item to generate identifier data. The system also comprises a data storage device containing a plurality of information content files and a terminal configured to store general file access information and database connection information. The general file access information includes at least data storage device connection information. The system further comprises a database containing a plurality of identifier data entries and a plurality of file data entries. Each of the plurality of identifier data entries is associated with at least one of the file data entries. As part of the system, an information content file request transmitted by the terminal to the data storage device is based on at least the general file access information and one of the file data entries. The one of the file data entries is received in response to a file data entry request transmitted by the terminal to the database.

In one embodiment, an entity separate from a company that provides the identifier bearing item maintains some control over the information content files. In one such embodiment, the control includes developing at least some of the content of the information content files. In another such embodiment, the control includes maintaining the information content files. In a further such embodiment, the control includes developing guidelines for the information content files. In one embodiment, the entity is a retail establishment containing the terminal. In another embodiment, the entity is a content management entity. In a further embodiment, each of a plurality of entities separate from companies providing identifier bearing items maintains some control over some of the information content files.

In an additional embodiment of the system for storing and retrieving information content related to an identifier bearing item, the file data entry request is based on at least the decoded identifier data and is transmitted based on at least database connection information stored in the terminal. In various embodiments of the system for storing and retrieving information content related to an identifier bearing item, the information content file request is a file transfer protocol request or a hypertext transfer protocol request. In one embodiment of the system for storing and retrieving information content related to an identifier bearing item, the general file access information specifies a network address of the data storage device and each of the file data entries provide information identifying one of the information content files. In various embodiments of the system for storing and retrieving information content related to an identifier bearing item, the terminal is a transaction terminal, a portable data terminal, an information kiosk, a cash register, or a self-checkout terminal. In some embodiments, the information content files include image files, extensible mark-up language files, and/or text files. In another embodiment, the reader is further capable of decoding the identifier. In another embodiment, the general file access information specifies the location of the data storage device and the file data entries specify file paths on the data storage device. In a further embodiment, the general file access information specifies the location of the data storage device and a first file path portion and the file data entries specify second file path portions, the second file path portions including file names. In an additional embodiment, the file data entries are file names.

In another aspect the invention features a system for storing and retrieving information content related to an identifier bearing item. The system comprises a reader capable of reading an identifier on the identifier bearing item to generate identifier data. The identifier data specifying at least a source of the identifier bearing item. The system also comprises a database containing a plurality of identifier data entries. Each of the identifier data entries is associated with a redirection entry. In addition the system comprises a terminal in communication with the reader. The terminal is configured with database connection information. The system also comprises a data storage device containing a plurality of information content files. At least one of the plurality of information content files is related to the identifier bearing item. The system further comprises a communications network in communication with the terminal, the database and the data storage device. The system also comprises an entity separate from the source of the identifier bearing item that maintains some control over the at least one of the plurality of information content files related to the identifier bearing item. In operation, the terminal establishes communication with the data storage device and requests at least one of the at least one of the plurality of information content files that is related to the identifier bearing item based on the redirection entry associated with the identifier bearing item.

In various embodiments, the source of the identifier bearing item is a manufacturer or an importer of the identifier bearing item. In one embodiment of the system, the some control comprises maintaining the information content files. In another embodiment of the system, the some control comprises developing guidelines for the information content files. In a further embodiment of the system, the some control comprises developing at least some of the content of the information content files. In an additional embodiment of the system, the entity is a retail establishment containing the terminal. In yet another embodiment of the system, the entity is a content management entity. In a further embodiment of the system, each of a plurality of entities separate from a plurality of sources for a corresponding plurality of identifier bearing items maintains some control over some of the information content files.

In another aspect the invention features a method for storing and retrieving information content related to an identifier bearing item. The method comprises configuring a terminal with database connection information. The database contains a plurality of identifier data entries. Each of the identifier data entries is associated with a redirection entry. The method also comprises reading an identifier on the identifier bearing item to generate identifier data, the identifier data specifying at least a source of the identifier bearing item. In addition the method comprises transmitting from the terminal to the database a redirection request. The redirection request is transmitted based on at least the stored database location information and includes at least the identifier data. Further, the method comprises receiving by the terminal from the database a redirection entry. Additionally, the method comprises transmitting an information content file request by the terminal to one of a plurality of data storage devices based on at least the redirection entry. The information content file request identifies at least one of a plurality of information content files stored on the one of the plurality of data storage devices. The at least one of the plurality of information content files is related to the identifier bearing item. The method also comprises receiving by the terminal from the one of the plurality of data storage devices the at least one of the plurality of information content files. As part of the method, an entity separate from the source of the identifier bearing item maintains some control over the at least one of the plurality of information content files that is related to the identifier bearing item.

In various embodiments of the method, the source of the identifier bearing item is a manufacturer or an importer of the identifier bearing item. In one embodiment of the method, the some control comprises maintaining the information content files. In another embodiment of the method, the some control comprises developing guidelines for the information content files. In a further embodiment of the method, the some control comprises developing at least some of the content of the information content files. In an additional embodiment of the method, the entity is a retail establishment containing the terminal. In yet another embodiment of the method, the entity is a content management entity. In a further embodiment of the method, each of a plurality of entities separate from a plurality of sources for a corresponding plurality of identifier bearing items maintains some control over some of the information content files.

In another aspect, the invention features a method of storing and retrieving information content related to an identifier bearing item. The method comprises storing database connection information on a terminal. The database contains a plurality of identifier data entries and a plurality of information content files, each of the plurality of identifier data entries is associated with at least one of the information content files. The method also comprises reading an identifier on the identifier bearing item to generate identifier data. In addition the method comprises transmitting a request for an information content file based on at least the stored database connection information. The request for the information content file includes at least the identifier data.

In one embodiment, the current method further comprises processing the request by the database to identify the identifier data entry corresponding to the identifier and to locate the information content file associated with the identifier data entry. In an additional embodiment, the method further comprises transmitting to the terminal for display the at least one information content file. In another embodiment of the current method, the terminal is a transaction terminal. In yet another embodiment of the current method, the terminal is a potable data terminal. In various embodiments, the database connection information comprises a network address and/or telephony connection information. In an additional embodiment, the database is located on the terminal. In a further embodiment, the terminal is a cash register. In yet another embodiment of the current method, the information content files include image files. In yet an additional embodiment of the current method, the information content files include XML files. In yet a further embodiment of the current method, the information content files are text files. In another embodiment of the current method, the identifier is stored in or represented by a barcode, a RFID tag, a smart card, a credit card magnetic strip, a biometric data storage device and the like.

In another aspect, the invention features a system for storing and retrieving information content related to an identifier bearing item. The system comprises a database containing a plurality of identifier data entries and a plurality of information content files, each of the plurality of identifier data entries is associated with at least one of the information content files. The system also comprises a terminal configured with database connection information. In addition, the system comprises an identifier reader capable of reading an identifier on the identifier bearing item to generate identifier data.

In another embodiment of the current system, the terminal is a transaction terminal. In yet another embodiment of the current system, the terminal is a portable data terminal. In yet another embodiment of the current system, the terminal is a cash register. In various embodiments of the current system, the database connection information comprises a network address and/or telephony connection information. In an additional embodiment of the current system, the information content files include image and/or graphics files. In a further embodiment of the current system, the information content files include XML files. In yet a further embodiment of the current system, the information content files include text files.

In another aspect, the invention features a method of storing and retrieving information content related to an identifier bearing item. The method comprises storing general file access information on a terminal. The general file access information specifies at least the location of a data storage device. The data storage device contains a plurality of information content files. The method also comprises storing the location of a database on the terminal. The database contains a plurality of identifier data entries and a plurality of file data entries. Each of the plurality of identifier data entries is associated with at least one of the file data entries. Each of the file data entries when combined with the general file access information specifies the location of at least one of the plurality of information content files. In addition the method comprises reading an identifier on the identifier bearing item to generate identifier data. The method further comprises receiving from the database a file data entry. The file data entry is received in response to a file data entry request. The file data entry request is transmitted to the stored database location and includes the identifier data. Still further the method comprises formulating an information content file request. The information content file request includes at least the stored general file access information and the file data entry.

In another embodiment of the current method, the general file access information specifies the location of the data storage device and the file data entries specify file paths on the data storage device. In an additional embodiment of the current method, the general file access information specifies the location of the data storage device and a first file path portion and the file data entries specify second file path portions. The second file path portions include file names. In a further embodiment of the current method, the file data entries are file names. In yet an additional embodiment of the current method, the terminal is a transaction terminal. In yet another embodiment of the current method, the terminal is a portable data terminal. In yet another embodiment of the current method, the terminal is a cash register. In yet a further embodiment of the current method, the information content files include text, image and/or XML files. In still a further embodiment of the current method, the reader is also capable of decoding the identifier data.

In another aspect, the invention features a system for storing and retrieving information content related to an identifier bearing item. The system comprises a reader capable of reading an identifier on the identifier bearing item to generate identifier data. The system also comprises a data storage device containing a plurality of information content files. In addition, the system comprises a terminal having a memory configured to store general file access information. The general file access information specifies at least the location of the data storage device. Further, the system comprises a database containing a plurality of indicia data entries and a plurality of file data entries, each of the plurality of identifier data entries is associated with at least one of the file data entries. Each of the file data entries when combined with the general file access information specifies the location of at least one of the plurality of information content files.

In another embodiment of the current system, the general file access information specifies the location of the data storage device and the file data entries specify file paths on the data storage device. In another embodiment of the current system, the general file access information specifies the location of the data storage device and a first file path portion and the file data entries specify second file path portions. The second file path portions include at least file names. In a further embodiment of the current system, the file data entries are file names. In yet another embodiment of the current system, the terminal is a transaction terminal. In yet an additional embodiment of the current system, the terminal is a portable data terminal. In yet a further embodiment of the current system, the information content files are image and/or graphics files. In a still further embodiment of the current system, the information content files are XML files. In still another embodiment of the current system, the information content files are text files.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
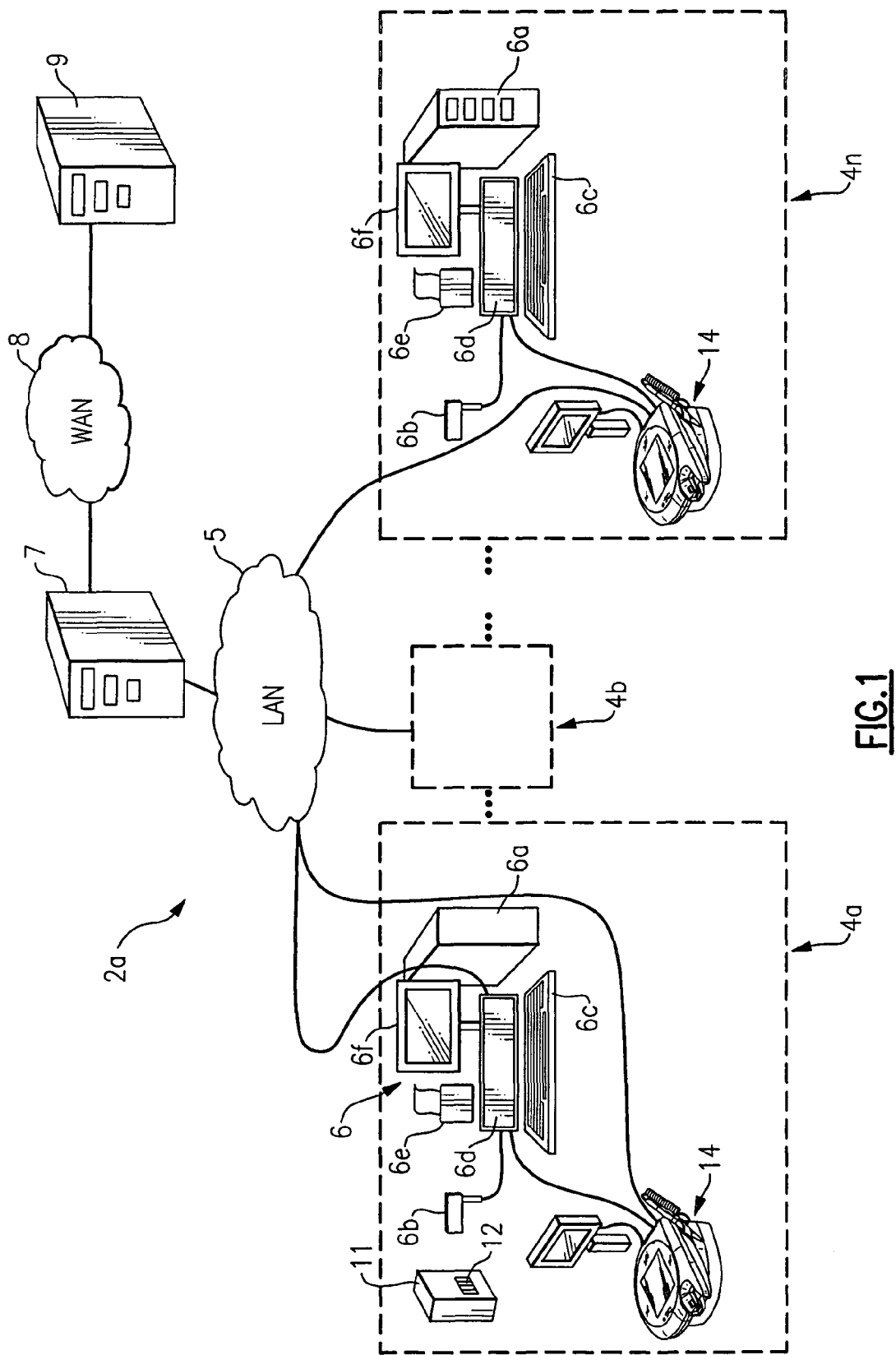
FIG. 1 is an embodiment of an identifier associated information content storage and retrieval system implemented with a plurality of point-of-sale locations.

In one embodiment, the present invention features a terminal, such as a transaction terminal or a portable data terminal, that is configured to access information content associated with an identifier. For example in one embodiment, reading an identifier at a point-of-sale location in a retail environment causes supplemental information, such as promotions, to be retrieved and displayed to a shopper. In various embodiments, the identifier, such as an alphanumeric sequence, can be stored or represented in various forms such as an indicia such as a one or two dimensional barcode or other symbology, a stock keeping unit (SKU), a coupon, a biometric data storage device, a credit card magnetic stripe, a smart card, a radio frequency identifier (RFID) tag, or a radio frequency (RF) payment token such as a key fob or a RF enabled credit card, ATM card, debit card or the like.

In one embodiment, information content files, such as text files, image files, audio files, graphics files, video files, extensible mark-up language (XML) files and the like, that provide information related to an identifier bearing item, such as a consumer item with a barcode, are stored on a data storage device such as a database or a file server on a network computer. In another device, such as a second networked database, identifier data entries, such as decoded UPC data, are associated with file data entries, such as file names or indices. General file access information that is used in accessing the information content files is configured in a terminal. In operation an identifier, such as a UPC barcode, is read by the terminal and is used to extract one of the file data entries from the database based on database communication information configured in the terminal. The file data entry in combination with the general file access information is then used to establish communication with the data storage device and to extract one of the information content files. In one embodiment, the database is located on a computer system remote from the terminal and the data storage device is located on the terminal.

In an additional embodiment, a database directly associates identifier data with information content files. In this embodiment, information for establishing communication with the database is stored on the terminal. Configuring the terminal with data storage device and/or database connection information while storing the information content files in the database or data storage device provides direct, efficient and scalable systems and methods for storing, managing, and retrieving information content associated with an identifier. In various other embodiments, the terminal can be a transaction terminal, an information and/or transaction kiosk, a portable data terminal, a personal data assistant (PDA), a cash register, a point-of-sale location, a cellular phone or an alternative computing device of an arbitrary form factor that is configured to access information content associated with an identifier. In one embodiment, the terminal is a self-checkout terminal that includes the functionality of a transaction terminal, a cash register, an information kiosk, and an identifier reader.

Referring to FIG. 1, an embodiment of a system 2a for storing and retrieving information content associated with an identifier is shown. The system 2a is an embodiment of the invention implemented in a point-of-sale environment. The system 2a includes a plurality of point-of-sale 4a, . . . , 4n locations (generally 4) such as those that are commonly found in a retail environment. Each point-of-sale location 4 includes a PC POS cash register 6 and a transaction terminal 14. The PC POS cash registers 6 and the transaction terminals 14 are connected to a local area network (LAN) 5, such as a wired or wireless Ethernet network. In some embodiments, the wireless network can be constructed in accordance with any of the 802.11 family of specifications. Additionally part of the system 2a and connected to the LAN 5 is a local store computer 7. The system 2a also includes a remote computer 9 connected to the store computer 7 via a wide area network (WAN) 8 such as the Internet. In various embodiments, the WAN 8 can include or be replaced with a variety of communication links such as traditional and cellular telephone and satellite networks. In operation, the store computer 7 supports network traffic so that the PC POS cash register 6 and the transaction terminal 14 can communicate directly with the remote computer 9. In alternative embodiments, the PC POS cash register 6 and the transaction terminal 14 are directly connected to the WAN 8.

The PC POS cash register 6 typically includes a personal computer housed in a conventionally known PC housing 6a and multiple interfacing or associated components including an image reader 6b, a keyboard 6c, a cash register drawer 6d, a printer 6e, and a monitor 6f. In one embodiment the image reader 6b is used to read and/or decode one and two dimensional bar codes, symbols and images. In another embodiment, the image reader 6b can be a laser scanner or can include RFID or RF reading and decoding capacity. The identifier in the embodiment shown in FIG. 1 is a bar code 12 on an article of commerce 11. In alternative embodiments, the identifier can be stored in or represented by an indicia such as a symbol or graphic, a RFID tag, a RF payment token such as a key fob, a credit card magnetic stripe, biometric data, or other physical, optical, and/or electromagnetic objects that can be used to store identification information such as an alphanumeric sequence.

Typically PC POS cash registers 6 are equipped with communication interfaces, e.g. a dial-up or cable modem interface, a USB interface, a PCMCIA interface, a wireless or hardwired Ethernet interface, a RS232 interface, an IBM Tailgate Interface RS485 interface, a PS/2 keyboard/mouse port, a specialized audio and/or video interface, a CompactFlash interface, a PC Card Standard interface, a Secure Digital standard for memory, a Secure Digital Input Output for input/output devices and/or any other standard or proprietary device interface. A CompactFlash interface is an interface designed in accordance with the CompactFlash standard as described in the CompactFlash Specification version 2.0 maintained at the website http://www.compactflash.org. The CompactFlash Specification version 2.0 document is herein incorporated by reference in its entirety. A PC Card Standard interface is an interface designed in accordance with the PC Card Standard as described by, for example, the PC Card Standard 8.0 Release—April 2001 maintained by the Personal Computer Memory Card International Association (PCMCIA) and available through the website at http://www-.pcmcia.org. The PC Card Standard 8.0 Release—April 2001 Specification version 2.0 document is herein incorporated by reference in its entirety. The interfaces that can be included in various embodiments enable communication with external computer systems, computing devices such as the transaction terminal 14, the image reader 6b, the keyboard 6c, the printer 6e and the monitor 6f and networks such as the LAN 5 and/or the WAN 8.

Figure 2:
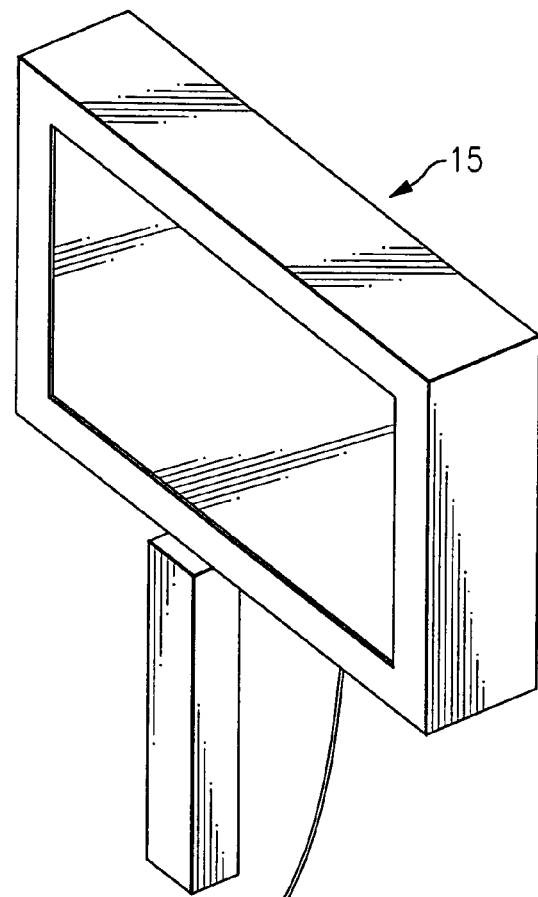
FIG. 2 is a perspective drawing of one embodiment of the transaction terminal of FIG. 1.
Figure 2:
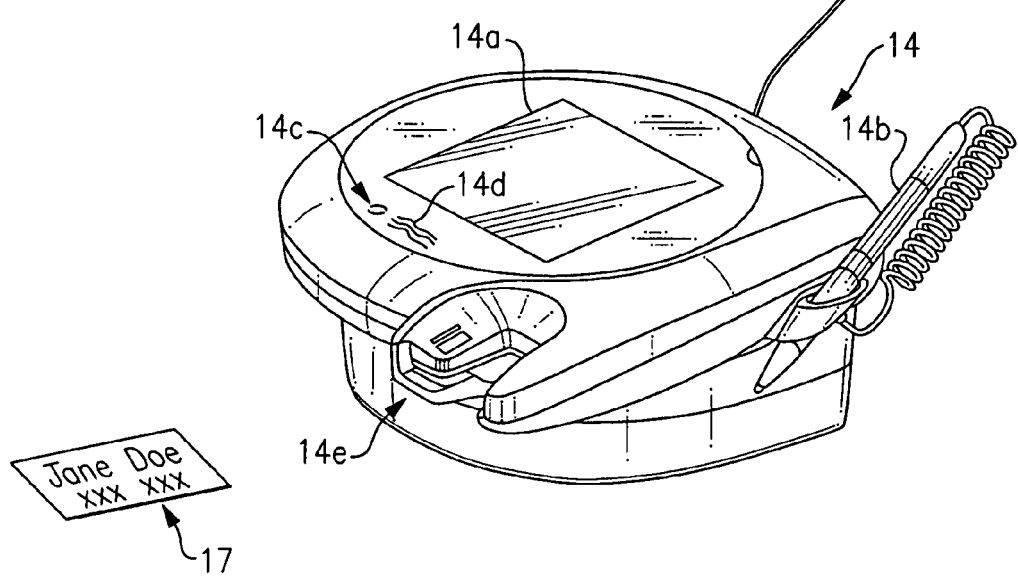

Referring to FIG. 2, a perspective drawing showing additional details of the transaction terminal 14 is presented. As part of a system for storing and retrieving information content associated with an identifier, the transaction terminal 14 can be used in a wide range of environments where potentially secure interactive communications are required with a custom/user. For example, the transaction terminal 14 can be used to facilitate a remote user's access to a central database and/or to access financial transaction information.

In operation the transaction terminal 14 may be adapted for reading card information, for secure receipt of personal identification (PIN) information, for signature capture, and numerous other functions. The transaction terminal 14 includes a touch screen 14a, a stylus 14b, an indicator 14c, an information message 14d, and a card reader 14e. The touch screen 14a and the stylus 14c are used as a user interface to provide information to and receive information from a user/customer. The touch screen 14a includes a display and a touch pad overlay and among other functions serves as a virtual keypad and signature capture platform. In the embodiment shown in FIGS. 1 and 2, the transaction terminal 14 also includes an additional display screen 15 for presenting information to the user/customer. The display screen 15 can be a LCD flat panel display having a larger size and greater resolution than the touch screen 14a thereby enabling the presentation of more sophisticated images, graphics and/or animation than can be supported by the touch screen 14a.

As shown in FIG. 2, a card 17 that can be processed by the card reader 14e may be, for example, a credit card, a smart card, a debit card, a customer loyalty card, an electronic benefits card, a company-sponsored benefits card, or an identification card containing magnetic stripe, smart card, and/or RF data. As discussed below, the functionality of the card reader 14e can be expanded or replaced with units capable of receiving and processing other, or multiple forms of, user/customer identifier information such biometric information. In various embodiments, the biometric information referred to above and with respect to other embodiments can include finger prints, hand prints, retinal patterns, face patterns, DNA sequences, kinetic information such as patterns of movement including walking, voice patterns, information entry patterns such as typing speed, pheromone identifiers and/or other physical or biological identifiers.

Security for the transaction terminal 14 is facilitated by the indicator 14c and the information message 14d. In operation the indicator 14c is made responsive to a changing encryption mode signal so that the indicator 14c is active only when an encryption routine is called. Still further, in accordance with the secure information entry security feature, in one embodiment an information message 14d is displayed on or about the transaction terminal 14 or visible by a customer-user of the transaction terminal 14 that informs the customer-user that the customer-user should enter secure, e.g., PIN information, only if indicator 14c is active. Information message 14d is preferably substantially permanently affixed to the transaction terminal 14 so that an unscrupulous party cannot easily remove or destroy the information message 14d.

Figure 3:
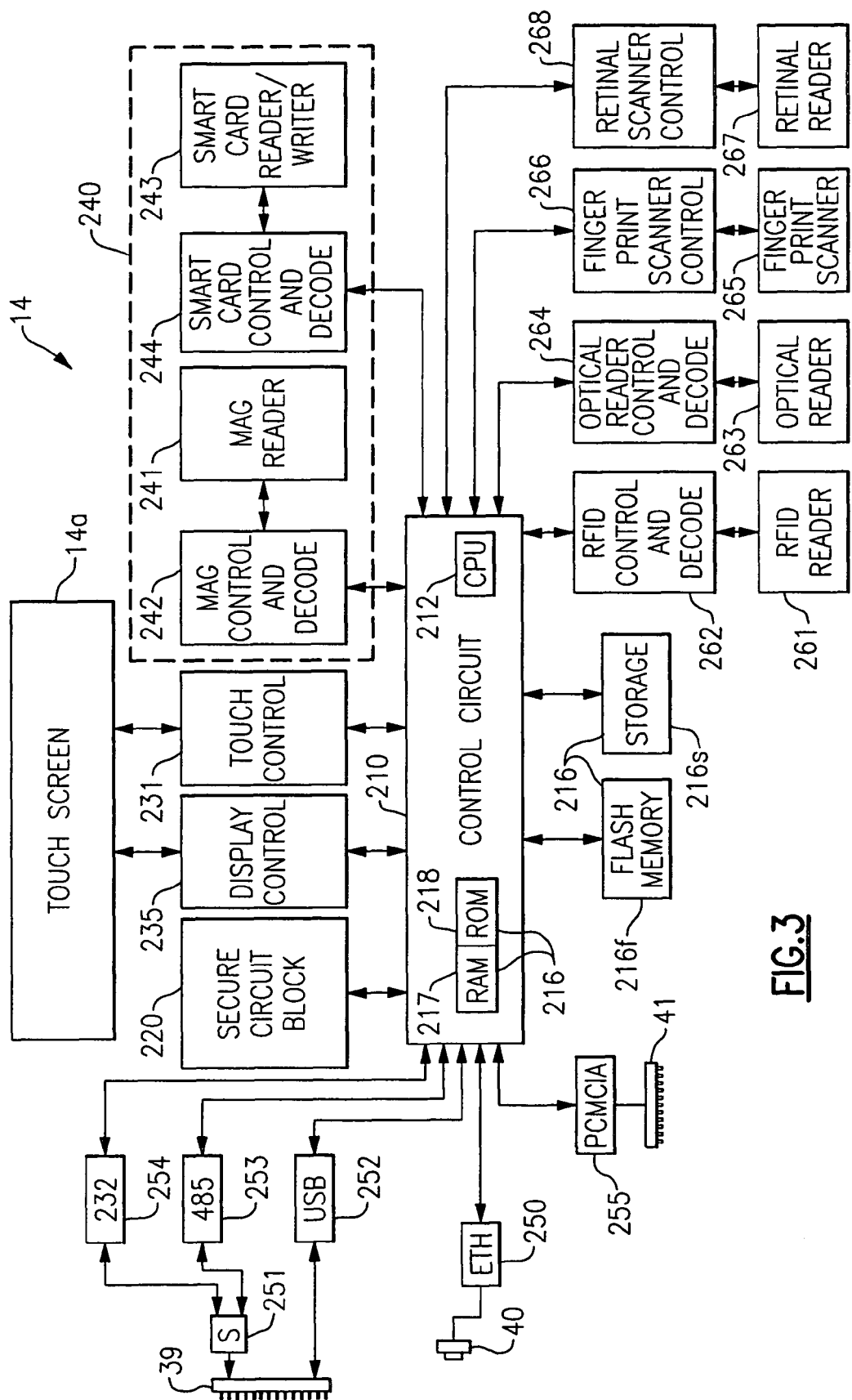
FIG. 3 is a block diagram of the functionality of one embodiment of the transaction terminal of FIG. 2.

A high-level electrical block diagram of the transaction terminal 14 is shown in FIG. 3. Transaction terminal 14 includes a control circuit 210 that comprises at least one integrated circuit (IC) microchip. For example, an Intel 133 Mhz or 206 Mhz SA-1110 Strong-arm central processing unit CPU is suitable for use in circuit 210, although faster and less expensive CPU IC's will be preferred when they become available. In addition to having a central processing unit, CPU 212, control circuit 210 further includes a memory 216 typically having at least random access memory (RAM) 217 and read only memory (ROM) 218 memory devices. ROM 218 may be a reprogrammable ROM, otherwise known as a "flash" ROM.

Control circuit 210 may be in communication with other types of memory including "flash" type memory, e.g. a memory device 216f sold under the commercial names "Multimedia MMC," "Smart Media," "CompactFlash," and "Memory Stick." Flash type memory devices are especially useful for storing image data and signature data. Memory 216 which may be included in or in communication with control circuit 210 may also comprise a long-term storage device 216s such as a hard drive, a floppy disk, or a compact disc. It has become increasingly common to package memory devices, particularly RAM and ROM devices within a single IC chip including control circuit CPU 212, RAM 216, and ROM 218.

Control circuit 210 is in communication with a number of components, including card reader 14e that can be an insert style (also known as "dip" style) hybrid magnetic stripe and smart card reader/writer 240. A hybrid reader 240 may be an OEM integrated unit, e.g. a ZU series reader of the type available from Matsushita of Japan, a ST-40 series hybrid reader available from Secure-Tech, or a hybrid reader of the type available from IDTECH. Hybrid reader 240 includes a magnetic stripe reader 241 in communication with magnetic control and decode circuit 242 and smart card reader/writer 243 in communication with smart card control and decode circuit 244.

Control circuit 210 in the embodiment of FIG. 3 is also in communication with a RF ID reader unit having a reader 261, with associated control and decode circuit 262. RF ID reader 261 may be, for example a Kronegger miniaturized RF reader. In one embodiment, the reader 261 reads RF payment tokens, such as RF enabled transaction cards such as credit cards, debit cards, ATM cards, and the like. In one such an embodiment, the reader 261 can be integrated into the hybrid reader 240 along with the corresponding control and decode circuit 262.

Another user interface data input device that may be disposed in communication with control circuit 210 is an optical reader unit or imaging assembly having module assembly 263 and associated control and decode out circuit 264. Control and decoding could also be carried out by control circuit 210. A model IT 4000 or IT 4200 optical reader module with decode out circuit of the type available from Hand Held Products, Inc. of 700 Visions Drive, P.O. Box 208, Skaneateles Falls, N.Y. may be selected to provide the function indicated by blocks 263 and 264. Module 263 could also be a linear image sensor module or any commercially available bar code scanner such as an IMAGETEAM™ 4410 Hand Held 2D Imagers from Hand Held Products. In various embodiments the optical reader unit can be used to read and/or decode one and two dimensional bar codes, symbols and the like.

Still further, control circuit 210 may be in communication with a fingerprint scanner unit having a scanner 265 and associated control circuitry 266. A fingerprint scan unit may be provided by, for example, by a Bioscrypt, Inc. OEM module fingerprint scan unit, a BERGDATA OEM module fingerprint scan unit or an ULTRA SCAN Corp. Series 400 OEM Fingerprint Scan unit. Transaction terminal 14 may capture an electronic fingerprint representation and send the electronic fingerprint representation to a non-integral computer system or to the store computer 7 or remote computer 9 for processing. Also the transaction terminal 14 may periodically download a database of relevant electronic fingerprint authorizations for use by control circuit 210 in performing fingerprint identification functions for use, for example, in providing biometric identification for specified transactions.

Transaction terminal 14 can also include a retinal scan unit including scanner 267 associated control circuit 268. A scan unit including scanner 267 and control circuit 268 may be provided by components from an Icam 2001 retina scan unit available from Eye Dentify Corp. Control circuit 210 may perform identifications based on captured retinal scan signatures by transmitting captured electronic retinal signatures to a nonintegrated computer system for identification or by downloading a database of signatures from, for example from the remote computer 9, for identification by circuit 210. In other embodiments, as discussed above, the transaction terminal can also include software and/or hardware for biometric information related to hand prints, face patterns, DNA sequences, kinetic information such as patterns of movement including walking, voice patterns, information entry patterns such as typing speed, pheromone identifiers and/or other physical or biological identifiers.

As discussed with respect to FIG. 2, the transaction terminal 14 includes a touch screen 14a including a display and a touch pad overlay. Touch screen 14a displays information to a user such as prompt information, advertising messages, etc. Touch screen 14a also serves as a means to input data as, for example, a virtual keypad and signature capture platform. The display of touch screen 14a may include a LCD display such as a 5.7" ¼ VGA (320×240) resolution color or monochrome LCD screen of the type available from Nan Ya Corporation. The display may be driven by an on-chip LCD controller available on a microchip including circuit CPU 212 if appropriate circuitry is provided, or in association with dedicated control circuit 235 as shown in FIG. 3. The touch pad overlay may be, for example, a Nissa NIS/RC-872 overlay with parallel interface. The touch pad overlay typically operates in association with touch screen controller 231. Touch screen control circuit 231, like LCD circuit 235 can be integrated in an IC comprising elements of control circuit 210.

As shown in FIG. 3, the transaction terminal 14 may also include a secure circuit block 220 for preventing theft of electronically stored information such as PIN information. In various embodiments, operational elements of the transaction terminal 14 can be implemented in different combinations of hardware, software, and/or firmware. The operational elements of the transaction terminal 14 include the secure circuit block 220, the display control circuit 235, the touch control circuit 231, the magnetic control and decode circuit 242, the magnetic stripe reader 241, the smart card control and decode circuit 244, the smart card reader/writer 243, the RFID control and decode circuit 262, the RFID reader 261, the optical reader control and decode circuit 264, the optical reader 263, the finger print scanner control circuit 266, the finger print scanner 265, the retinal scanner control circuit 268, and the retinal scanner 267. Additional disclosure related to RFID and RF systems and methods is discussed in the U.S. application Ser. No. 10/825,088, filed Apr. 15, 2004, entitled "Proximity Transaction Apparatus And Methods Of Use Thereof," and hereby incorporated by reference in its entirety.

Still further, the transaction terminal 14 includes at least one and preferably more than one communication interface for providing communication with external computer systems such as the PC POS cash register 6, the LAN 5, and/or the WAN 9. In the specific embodiment shown in the block diagram of FIG. 3, the transaction terminal 14 includes a universal connector port 39 wherein at least a first pin or group of pins are in communication with a first type of interface and at least a second pin or group of pins are in communication within a second type of interface. In the embodiment shown in FIG. 3, the universal connector port 39 is connected to a switching circuit 251 for switching the path between connector 39 and a RS 232 interface 254 and a RS485 IBM Tailgate Interface 253. The universal connector port 39 is also connected to a USB interface 252. In alternative embodiments, the universal connector port 39 includes additional groups of pins in communication with additional types of interface. The transaction terminal 14 also includes an Ethernet interface 250 connected to the I/O port 40.

Additionally, the transaction terminal 14 can include such interfaces as a PCMCIA interface 255 in communication with a PCMCIA slot connector 41. Slot connecter 41 may receive, for example, an RF communication card, a flash memory card, an optical reader PCMCIA card or other commonly available PCMCIA cards. A RF or other wireless type of interface may also be provided in hard-wired communication with control circuit 210. Electrical circuitry associated with the above types of components are more commonly being packaged in an IC that comprises elements of control circuit 210. In alternative embodiments (not shown), the transaction terminal also includes a CompactFlash interface, a PC Card Standard interface, a Secure Digital standard for memory interface, a Secure Digital Input Output for input/output devices interface, a PS/2 keyboard/mouse interface, a specialized video and/or audio interface, and/or any other appropriate standard or proprietary device interface.

Including multiple interfaces in the transaction terminal 14 yields operational advantages. For example if the transaction terminal 14 is connected to a cash register with a limited capacity for data and instructional communications, the transaction terminal 14 can communicate directly via LAN 5, or in alternative embodiments via WAN 8, with remote computer systems such as the store computer 7 or the remote computer 9. In addition, the plurality of interfaces support the straight-forward attachment of a variety of devices.

In additional embodiments, the transaction terminal 14 can also transmit information such as voice or data communications via Global System for Mobile Communications (GSM), General Packet Radio Service (GPRS), Code Division Multiple Access (CDMA), Cellular Digital Packet Data (CDPD), Mobitex cellular phone and data networks and network components. In other embodiments, the transaction terminal 14 can transmit information using a DataTAC™ network or a wireless dial-up connection. Additional disclosure related to transaction terminal systems and methods is discussed in the U.S. application Ser. No. 10/339,444, filed Jan. 9, 2003, entitled "Transaction Terminal Comprising Imaging Module," and hereby incorporated by reference in its entirety.

Figure 4:
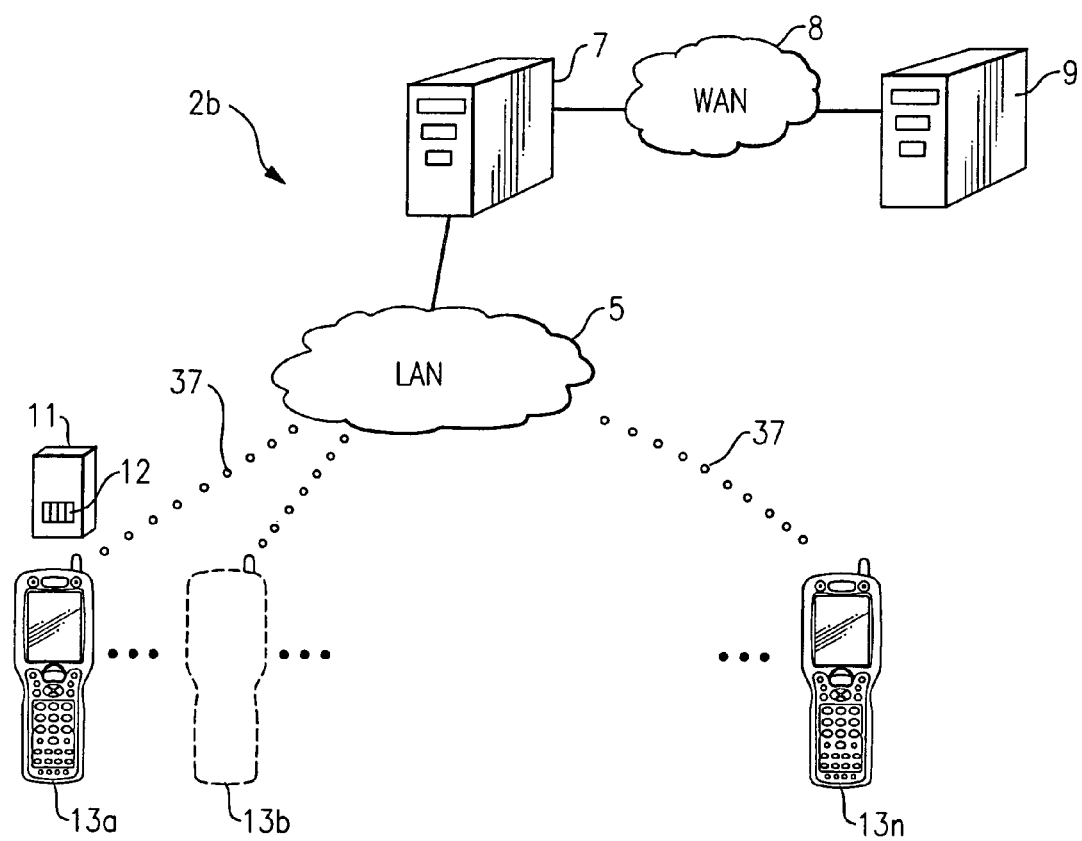
FIG. 4 is an embodiment of an identifier associated information content storage and retrieval system implemented with a plurality of portable data terminals.

Referring to FIG. 4, an embodiment of a system 2b for storing and retrieving information content associated with an identifier is shown. The system 2b includes a plurality of portable data terminals 13a, 13b, . . . , 13n (generally 13) such as those typically used in a warehouse, retail or shipping environment to access and/or store information associated with an identifier. The portable data terminals 13 can be any commercially available appropriate unit such as a Dolphin® 9500 from Hand Held Products, Inc. constructed in accordance with the principles of the invention. In the embodiment of FIG. 4, the identifier is a bar code 12 on an article of commerce 11 and the identifier reader is an optical reader. In alternative embodiments the identifier reader can include a magnetic stripe reader, a RF reader for interrogating and/or writing to RFID tags and RF payment tokens such as RF enabled transaction cards or key fobs, or another reader capable of reading physical, optical, and/or electromagnetic objects that can be used to store identification information such as alphanumeric sequences.

In the embodiment shown in FIG. 4, the portable data terminals 13 are in communication with a local area network (LAN) 5 via wireless connections 37. Additionally part of the system 2b and connected to the LAN 5 is a local store computer 7. The system 2b also includes a remote computer 9 connected to the store compute 7 via a wide area network (WAN) 8 such as the Internet. In alternative embodiments the portable data terminals 13 can communicate via a wireless wide area network (WWAN) modem with a remote computer system such as the remote computer 9. In additional embodiments, the portable data terminals 13 can also transmit information such as voice or data communications via Global System for Mobile Communications (GSM), General Packet Radio Service (GPRS), Code Division Multiple Access (CDMA), Cellular Digital Packet Data (CDPD), Mobitex cellular phone and data networks and network components. In other embodiments, the potable data terminals 13 can transmit information using a DataTAC™ network or a wireless dial-up connection.

Figure 5A:
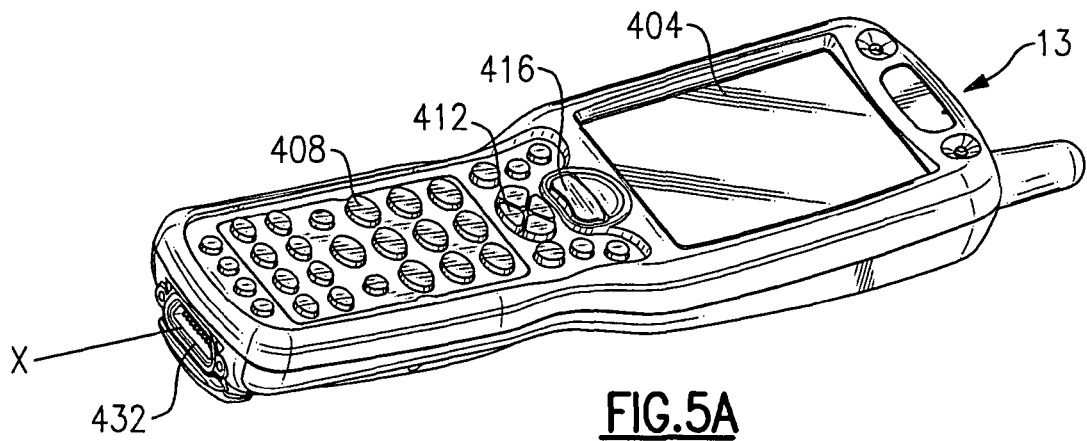
FIGS. 5A-5D show different perspective drawings of one embodiment of a portable data terminal of FIG. 4.
Figure 5B:
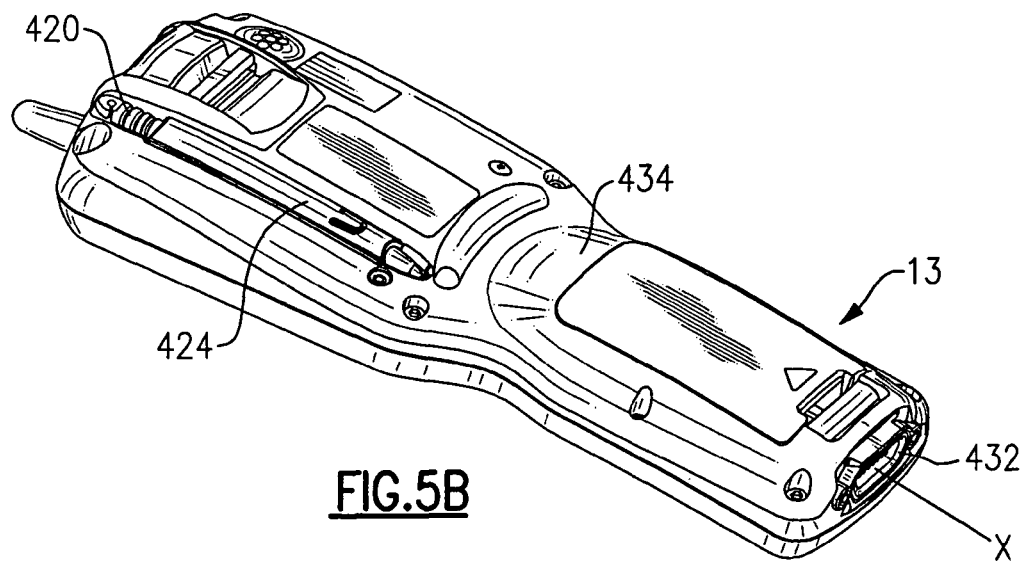
Figure 5C:
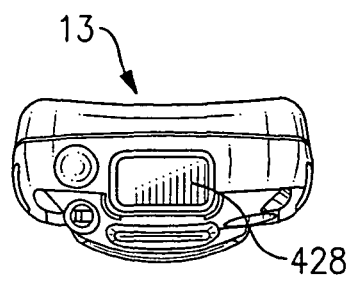
Figure 5D:
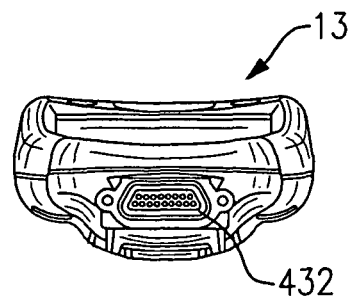

FIGS. 5A-5D show different perspective drawings of an exemplary portable data terminal 13 of FIG. 4. FIG. 5A shows a top perspective, FIG. 5B shows a bottom perspective, FIG. 5C shows a front perspective view, and FIG. 5D shows a back perspective view. As shown, the portable data terminal in one embodiment includes interface elements including a display 404, a keyboard 408, interface buttons 412 for example for positioning a cursor, a trigger 416, and a stylus 420 with a stylus holder 424. The portable data terminal 13 further includes an identifier reader 428 that in FIG. 5C is shown as an image reader and decoder. In additional embodiments the portable data terminal can have its functionality enhanced with the addition of multiple detachable computer peripherals. In various embodiments, the computer peripherals can include one or more of a magnetic stripe reader and decoder, a biometric reader and decoder such as a finger print scanner, a printer such as a receipt printer, a RFID tag or RF payment reader and decoder, and the like.

The portable data terminal 13 further includes an electromechanical interface 432 such as a dial-up or cable modem interface, a USB interface, a PCMCIA interface, an Ethernet interface, a RS232 interface, an IBM Tailgate Interface RS485 interface, a CompactFlash interface, a PC Card Standard interface, a Secure Digital standard for memory interface, a Secure Digital Input Output for input/output devices interface and/or any other appropriate standard or proprietary device interface. In various embodiments the electro-mechanical interface 432 can be used as part of attaching computer peripherals. The ability to augment the functionality of a computing device by attaching computer peripherals is discussed more extensively in the related U.S. application Ser. No. 10/819,655, filed Apr. 7, 2004, entitled "HTTP Enabled Computer Peripheral" and Ser. No. 10/819,616, filed Apr. 7, 2004, entitled "Routing Device And Method For Use With A HTTP Enabled Computer Peripheral," both of which are hereby incorporated by reference in their entirety. In addition in one embodiment, the portable data terminal 13 is designed to include a finger saddle 434. The finger saddle 434 is characterized, as best seen from the bottom view FIG. 5B, by a surface having a generally U-shaped configuration in a direction generally parallel to longitudinal axis, X, of the portable data terminal 13. The generally U-shaped surface conforms to the natural contour of an operator's relaxed finger.

Figure 6:
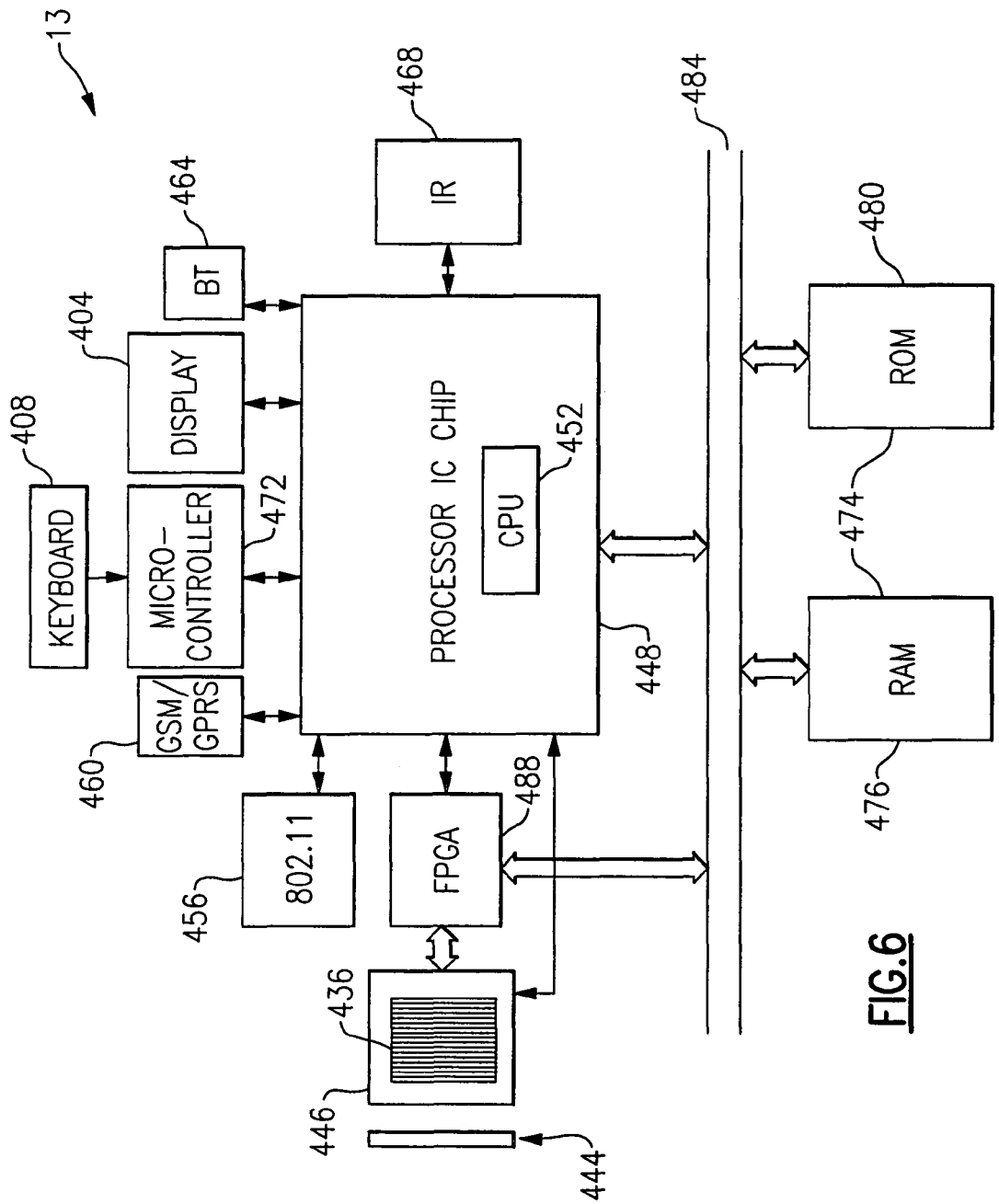
FIG. 6 shows an electrical block diagram of one embodiment of the portable data terminal of FIG. 4.

An electrical block diagram of one embodiment of the portable data terminal 13 is shown in FIG. 6. In the embodiment of FIG. 6, the identifier reader 428 includes an optical reader having an image engine including two-dimensional image sensor 436 provided on image sensor chip 440 and associated imaging optics 444. Image sensor chip 440 may be provided in an IT4000 or IT4200 image engine of the type available from HHP, Inc. of Skaneateles Falls, N.Y. The portable data terminal 13 further includes a processor integrated circuit (IC) chip 448 such as may be provided by, for example, an INTEL Strong ARM RISC processor or an INTEL PXA255 Processor. Processor IC chip 448 includes a central processing unit (CPU) 452. As indicated above, the portable data terminal 13 may include a display 404, such as a liquid crystal display, a keyboard 408, a plurality of communication or radio transceivers such as a 802.11 radio communication link 456, a GSM/GPRS radio communication link 460, and/or a blue tooth radio communication link 464. The portable data terminal 13 may further include an infrared (IR) communication link 468. The keyboard 408 may communicate with IC chip 448 via microcontroller chip 472. The portable data terminal 13 further includes a memory 474 including a volatile memory and a non-volatile memory. The volatile memory in one embodiment is provided in part by a RAM 476. The non-volatile memory may be provided in part by flash ROM 480. Processor IC chip 448 is in communication with the RAM 476 and ROM 480 via a system bus 484. Processor IC chip 448 and microcontroller chip 472 also include areas of volatile and non-volatile memory. In one embodiment, the processor IC chip 447 includes a control circuit that itself employs the CPU 452 and memory 474. Non-volatile areas of the memory 474 can be used, for example, to store program operating instructions.

In various embodiments, the processor IC chip 452 may include a number of I/O interfaces (not all shown in FIG. 6) including several serial interfaces (e.g., general purpose, Ethernet, blue tooth), and parallel interfaces (e.g., PCMCIA, Compact Flash).

For capturing images, the control circuit sends appropriate control and timing signals to image sensor chip 440 and to the field programmable gate array (FPGA) 488 or another programmable logic device (e.g., an ASIC). Operating under the control of the control circuit, the FPGA 488 manages the transfer of image data generated by the chip 440 into the RAM 476. The control circuit processes frames of image data to decode a bar code or a set of OCR characters, for example. Various bar code and OCR decoding algorithms are commercially available, such as by the incorporation of an IT4250 image engine with decoder board, available from HHP, Inc. The IT4250 decoder board decodes symbologies such as MaxiCode, PDF417, MicroPDF417, Aztec, Aztec Mesa, Data Matrix, QR Code, Code 49, UCC Composite, Snowflake, Vericode, Dataglyphs, Code 128, Codabar, UPC/EAN, Interleaved 2 of 5, RSS, BC 412, Code 93, Codablock, Postnet (US), BPO4 State, Canadian 4 State, Japanese Post, KIX (Dutch Post), Planet Code, OCR A, OCR B, and the like.

Among other operations, the infrared transceiver 468 facilitates infrared copying of data from a portable data terminal 13 in a broadcasting mode to a portable data terminal 13 in a receiving mode. Utilization of infrared transceiver 468 during a data copying session allows data broadcast from a single broadcast device to be simultaneously received by several receiving devices without any of the receiving devices being physically connected to the broadcasting device. Additional disclosure related to portable data terminals is discussed in the U.S. application Ser. No. 10/669,894, filed Sep. 23, 2003, entitled "Reprogramming System Including Reprogramming Symbol," and hereby incorporated by reference in its entirety.

Figure 7:
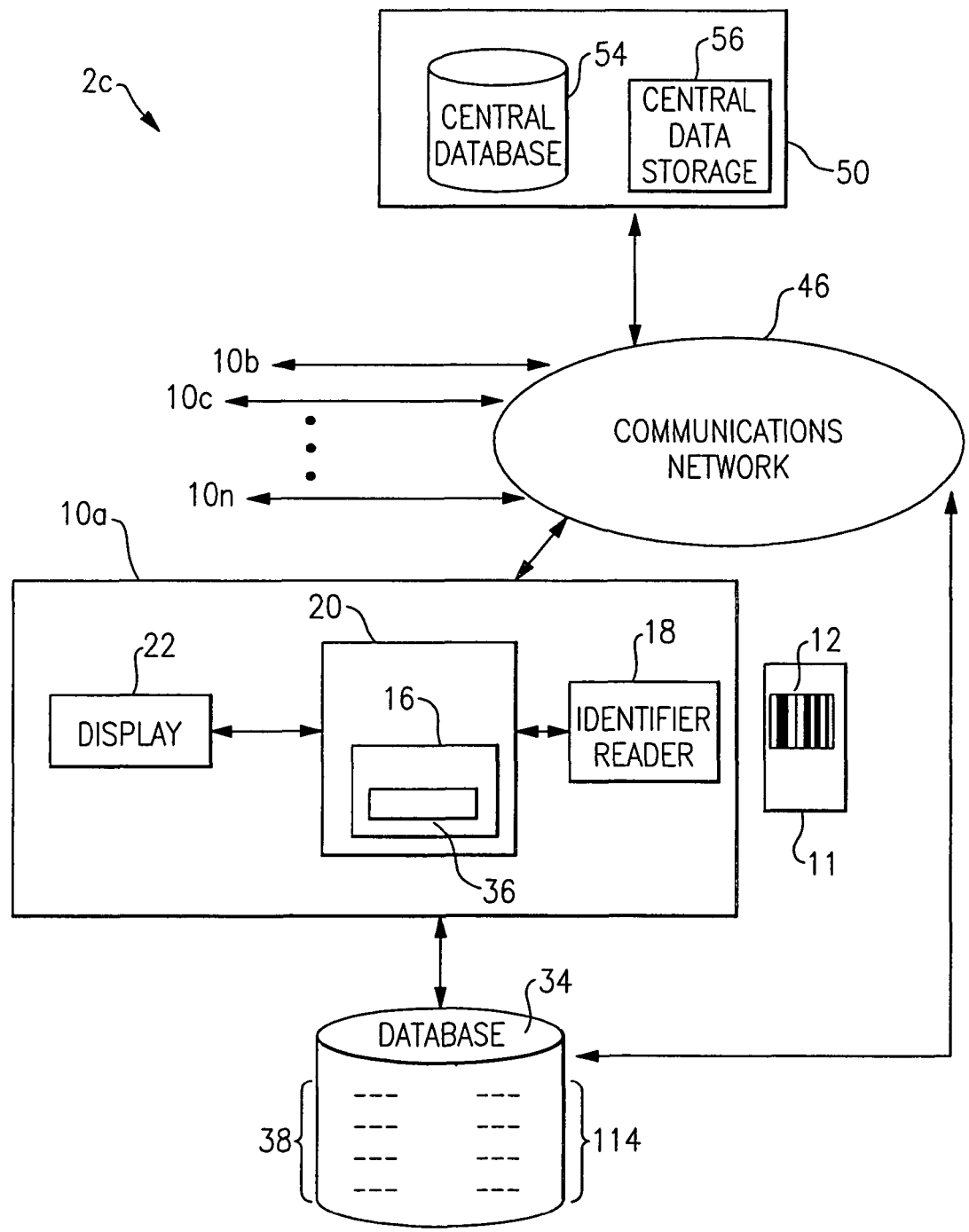
FIG. 7 is an embodiment of an identifier associated information content storage and retrieval system constructed in accordance with the principles of the invention.

Referring to FIG. 7, a block diagram of a system 2c for storing and retrieving information content associated with an identifier is shown. The system 2c shown in FIG. 7 encompasses the embodiments 2a and 2b shown in FIGS. 1 and 4. The system 2c includes a plurality of terminals 10a, 10b, 10c, . . . , 10n (generally 10). The terminals 10 are capable of reading an identifier and displaying information content associated with the identifier. Although not limited to the embodiments listed, the terminals 10 can be transaction terminals 14, portable data terminals 13, cash registers 6, point-of-sale locations 4, PDAs, cellular phones, self-checkout terminals or computing devices of an arbitrary form factor capable of storing connection information and retrieving and processing information content associated with an identifier. In various embodiments, the set of terminals 10 in the system 2c can include terminals 10 with different form factors.

As shown in FIG. 7 with respect to the terminal 10a, the terminals 10 comprise a computing unit 20, having a memory 16, that is communication with an identifier reader 18 and a display 22. In the embodiment shown in FIG. 7, the identifier reader 18 is an image reader and decoder, such as the optical reader 263 shown in FIG. 3, for reading an identifier on an identifier bearing item to generate identifier data. In FIG. 7, the identifier is a bar code 12 on an article of commerce 11. As indicated above in various embodiments, the identifier can be stored in or represented by various forms such as an indicia, a RFID tag, a RF payment token such as a key fob, a transaction card magnetic stripe, a smart card chip, a biometric data storage device or other physical, optical, and/or electromagnetic objects that can be used to store identification information such as an alphanumeric sequence. In additional alternative embodiments, the identifier reader 18 can be a hybrid reader 240, a RFID reader 261, a finger print scanner 265, a retinal scanner 267, or an alternative device capable of reading and/or decoding financial, product and/or identity related information. Among other functions, the display 22 is capable of presenting to a user/customer information associated with the identifier bearing item.

In one embodiment, the identifier data generated by the identifier reader 16 specifies according to an extrinsic standard at least a source of an identifier bearing item. In various embodiments, the source of the identifier bearing item can include the manufacturer, importer, distributor, and/or supplier of the identifier bearing item. As the originator of the identifier bearing item, the source is distinct from the vendor or retailer who sells or provides the identifier bearing item. In various embodiments, the vendor or retailer is the entity that controls the operation of the terminal 10 that is used to access and display information to a user/customer. In additional embodiments, the source of the identifier bearing object can be a provider of services associated with the identifier bearing object. For example in one such embodiment, the identifier bearing item is a coupon offering a discount for the purchase of a particular service.

Also as shown in FIG. 7, the terminal 10a is in communication with a relational database 34. Information required to access the relational database 34, such as a network address of the relational database 34, is configured in a portion 36 of the memory 16 of the computing unit 20. In one embodiment, the network address of the relational database is an Internet protocol (IP) address. In an alternative embodiment, the information required to access the relational database 34 includes point-to-point connection information, such as modem protocols or cellular phone and data connection information. In addition the terminal 10a, the database 34, and a central location 50 are connected to a communications network 46 including at least one LAN, WAN, WWAN, traditional or cellular telephone network and/or satellite link. The central location 50 contains a central database 54 and a central data storage device 56 and can reside on the remote computer 9 of FIGS. 1 and 4.

In alternative embodiments, the relational database 34 is integrated in other elements of the system 2c. For example in the embodiments shown in FIGS. 1 and 4, the relational database 34 could be present on the transaction terminal 14, the PC POS cash register 6, the portable data terminal 13, the store computer 7, and/or the remote computer 9. In an additional alternative embodiment, the terminal 10a is not directly connected to the relational database 34 and communication between the devices occurs over the communications network 46.

In the embodiment shown in FIG. 7, the relational database 34 contains a plurality of identifier data entries 38 and a plurality of information content files 114. Each of the plurality of identifier data entries 38 is associated with at least one of the information content files 114. The identifier data entries 38 can include alphanumeric representations of the identifier, such as the alphanumeric sequence encoded by the barcode 12. A non-exhaustive list of the types of information content files 114 includes text files, image files, graphics files, audio files, video files and/or XML documents. The information content files 114 can also include software code that when downloaded and executed by the computing unit 20 can, for example, initiate interaction with the user/customer such as an authentication procedure or a promotional offer requiring user/customer participation.

In some embodiments as described below in more detail, an entity separate from the source of the identifier bearing item maintains some control over the information content files. In one such embodiment, the control includes developing at least some of the content in the information content files. In another such embodiment, the control includes maintaining the information content files. In a further such embodiment, the control includes developing guidelines for the information content files. In one embodiment, the entity is a retail establishment containing the terminal. In another embodiment, the entity is a content management entity. In a further embodiment, each of a plurality of entities separate from a plurality of sources for a corresponding plurality of identifier bearing items maintains some control over some of the information content files.

Figure 8:
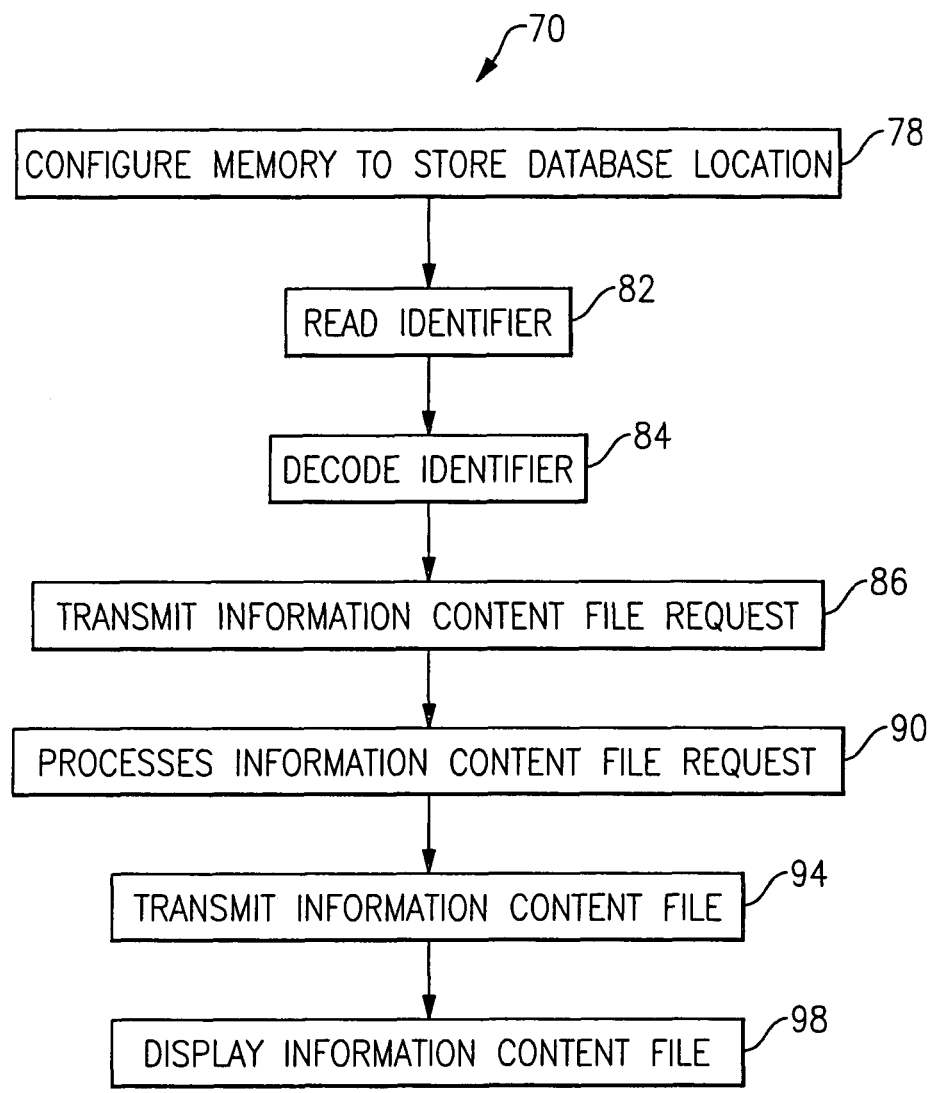
FIG. 8 is a flow-chart illustrating a process for employing the system of FIG. 7.

FIG. 8 shows one embodiment of a process 70 for retrieving from the database 34 an information content file 114 associated with an identifier bearing item. The process 70 includes configuring (step 78) the memory 16 of the computing unit 20 to store the database location information. In one embodiment, the database location information includes a network address such as an IP address. In another embodiment, the database location information also includes software routines and/or protocols that are used to access the database. In a further embodiment, the database location information includes elements necessary to establish a point-to-point connection between the terminal 10 and the database 34. For example in one such embodiment, the database information includes the telephone number and/or modem or other telephone device instructions necessary to establish a traditional or cellular telephony connection with a computer system housing the database.

To initiate the presentation of an information content file 114, an identifier is read (step 82) from an identifier bearing item and decoded (step 84). In some embodiments, the decoding is performed subsequently in the process. In one embodiment, reading an identifier includes scanning a barcode of a consumer product at a point-of-sale terminal location. In other embodiments, the reading and decoding of an identifier can include the reading and decoding of a RFID tag, a RF payment token, magnetic stripe data, and the like. Once the identifier has been read and decoded to generate decoded identifier data, the terminal 10 extracts from the memory 36 the location of the database 34. Next, the terminal 10 transmits (step 86) a request for an information content file 114 to the database 34. The request includes at least the decoded identifier data and is transmitted to the configured database location. The database processes (step 90) the request which includes locating the identifier data entry 38 corresponding to the decoded identifier and extracting at least one associated information content file 114. Once extracted from the database 34, the at least one information content file 114 is transmitted (step 94) to the terminal 10 for presentation (step 98) on the display 22. The presentation of the information content file 114 can involve the modification and/or processing of the information content file 114.

In various embodiments, the system 2c of FIG. 7 and the method 70 of FIG. 8 can be used to provide product or identifier bearing item related information to a consumer purchasing goods or services. In one embodiment, the product or goods information is stored on a backroom store computer that has an assigned network address. For the purposes of illustration in the current example, the network address is an IP address specified as 196.25.112.1. Further the address is configured in the memory of a PC based cash register that is part of a point-of-sale location.

In addition as part of the present illustrative example as part of a consumer's purchase of goods, the bar codes on the goods are read by a bar code scanner. The extracted bar code data is then translated into a decoded bar code data sequence. In one embodiment for each item that is scanned, the PC based cash register sends a request for an information content file that provides additional or supplemental information regarding the scanned product. In another embodiment, a request is sent for groups of scanned items or at periodic intervals. In a further embodiment, the information content files are stored as XML documents and the store computer contains a web server. In an additional embodiment, the information content files can be files having a variety of formats and the store computer contains a file transfer protocol (FTP) server.

As part of obtaining an information content file that in one embodiment is a XML document, the PC based cash register sends a hypertext transfer protocol (HTTP) request to a web server on a central computer. In one embodiment, the request is associated with a HTTP uniform resource locator (URL) that is of the form http://196.25.112.1:80?GET=7341600015 where the number 7341600015 corresponds to the Uniform Product Code (UPC) number associated with a particular product.

In general HTTP URLs can be associated with a HTTP request and are of the form:

http://host:port/path?query where host specifies the server name or network address, such as an IP address, of the location of the resource, port specifies the local server port to be utilized in accessing the resource, path specifies the path on the server to the file or program (when provided, the server decides on the interpretation of this information), and query provides arguments to the program (again, the program decides the interpretation of the query terms). In the current example, a relational database running on the web server uses the query information, i.e., the decode bar code data sequence 7341600015, to identify a corresponding XML document. Once located, the corresponding XML document is returned to the PC based cash register. In one embodiment the XML document requested is a hypertext mark-up language (HTML) document that contains text, images, graphics, video, and/or software code such as javascripts. In various embodiments the contents of the XML document can be presented to customer on a screen or display device either in direct or indirect communication with the PC based cash register. For example, the display device could be a screen associated with a transaction terminal that is in communication with the PC based cash register.

In an alternative embodiment, the network including the store computer and the point-of-sale locations includes a domain name service (DNS) that allows computers to be identified by textual identifiers. For example with a DNS enabled network, the URL above could be rewritten as http://central.computer:80?GET=7341600015

In one embodiment, an XML document contained in an information content file is used to provide supplemental or promotional material to a consumer regarding a product being purchased. For example in one embodiment where the item being purchased is a consumer item such as a television, stereo, personal computer, dish washer, refrigerator or the like, the supplemental information can be related to offering the customer an extended warranty. As an XML document, the information presented to the customer can include interactive components that allow the consumer to explore aspects of the additional information and/or purchase additional services. For example in one embodiment, the interactive components allow the user to follow hypertext links that provide further details on the warranty being offered. In one embodiment, the hypertext links refer back to files on the terminal, the store computer, or on another dedicated computer system. In another embodiment, the hypertext links refer to documents located on an independently maintained computer system, such Web or FTP servers associated with the product's company. As described above, these computer systems can be connected to the PC based cash register by local, wide area, and/or satellite networks. In another embodiment, the interactive components enable communication with the PC based cash register so that, for example, a consumer who desires to purchase the warranty can have the price of the warranty automatically added to cost of the item being purchased.

Figure 9:
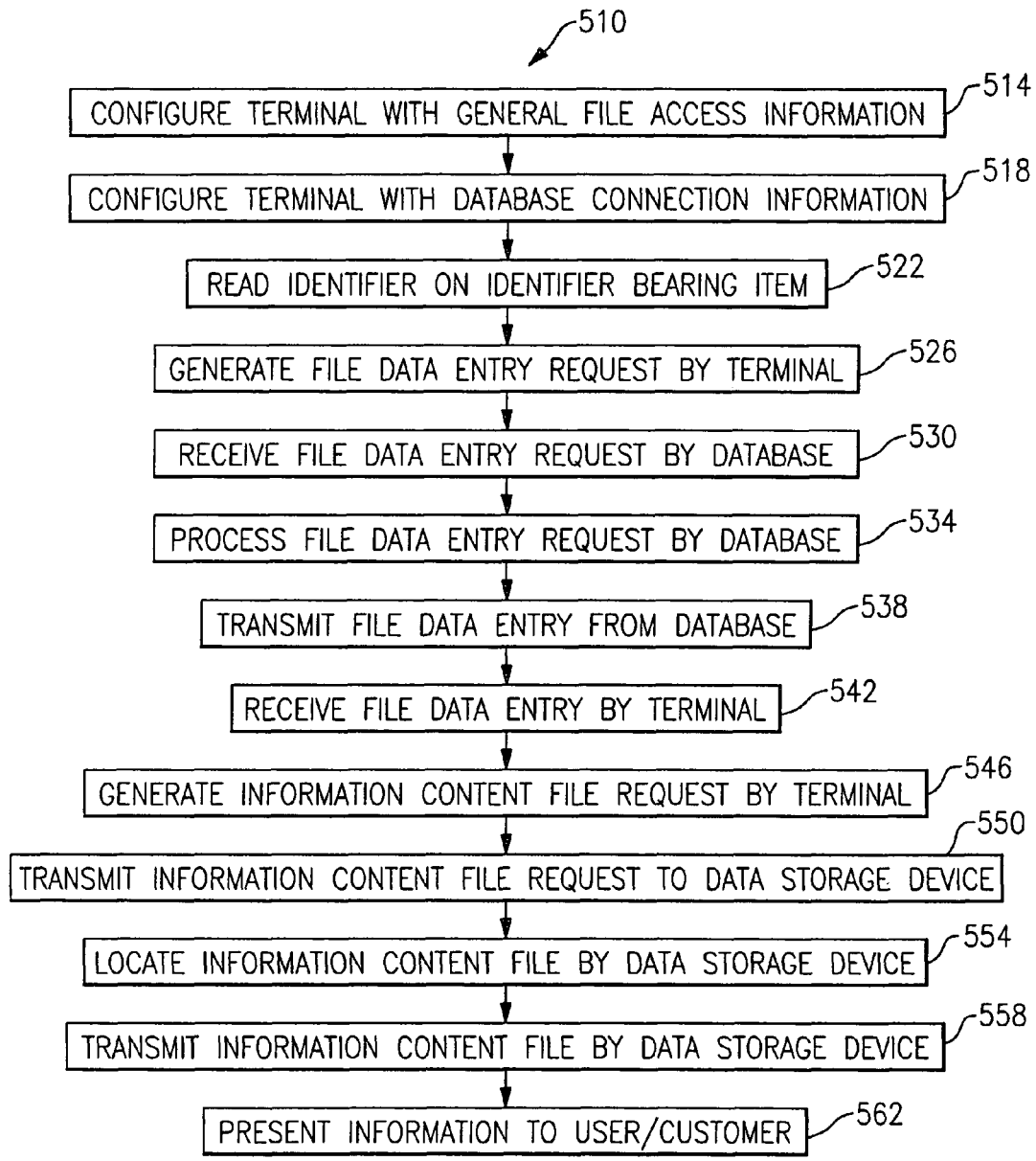
FIG. 9 is a flow-chart illustrating a process for retrieving identifier associated information content according to one embodiment of the invention.

FIG. 9 shows one embodiment of a process 510 for retrieving from a data storage device an information content file associated with an identifier on an identifier bearing item. The process 510 includes configuring (step 514) a terminal with general file access information. In one embodiment, the general file access information includes at least data storage device connection information used in establishing a connection with a data storage device over a local or remote network consisting of a variety of communication links such as telephone, computer, and/or satellite networks. In one embodiment, the communication link includes a wired or wireless packet based network such as an Ethernet network. In one embodiment, communication with the data storage device includes a formatted message that is transmitted over a transfer control/Internet protocol (TCP/IP) network. In another embodiment, the connection with the data storage device includes elements of a wide area network such as the Internet or includes a virtual private network. In another embodiment, the general file access information includes information used in establishing a point-to-point connection with the data storage device over, for example, a telephone based network. In further embodiments, the telephony network can be a traditional telephone network or a digital or analogy cellular phone or data network. In another embodiment, the data storage device is located on the same computer system as the terminal, and the data storage device connection information is used to access the data storage device locally, for example, over a computer bus. In one embodiment, configuring the terminal with general file access information includes storing a network address of the data storage device. In another embodiment, configuring the terminal with general file access information includes configuring and/or providing software, firmware, and/or hardware to enable the communication connection with the data storage device.

In various embodiments, the data storage device contains a plurality of information content files. In some embodiments, the information content files include information related to an identifier bearing item such as promotional, warranty, service, repair, and/or financial information. In an additional embodiment, the information content files are stored on multiple data storage devices. In various other embodiments, the terminal can be a transaction terminal, an information and/or transaction kiosk, a portable data terminal, a personal data assistant (PDA), a cash register, a point-of-sale location, a cellular phone or an alternative computing device of an arbitrary form factor that is configured to request information content associated with an identifier. In various embodiments, the data storage device can include a database, a web or file server, or another system capable of storing and providing information content files.

The process 510 also includes configuring (step 518) the terminal with database connection information. As with respect to the data storage device connection information, the database connection information is used in various embodiments to connect to a local or a remote database over a variety of communication links such as telephone, computer, and/or satellite networks or a computer bus. In one embodiment, communication with the database includes formatted messages transmitted over a wireless IP or wired TCP/IP connection. In another embodiment, configuring the terminal with database connection information includes storing a network address of the database. In another embodiment, configuring the terminal with database connection information includes configuring software, firmware, and/or hardware to enable communication with the data storage device.

In various embodiments, the database includes a plurality of identifier data entries and a plurality of file data entries. Each of the file data entries is associated with at least one of the identifier data entries. In one embodiment, each of the file data entries when combined with the general file access information provides at least some of the information required to access at least one of the plurality of information content files stored on the data storage device. In some embodiments, additional information required to access at least one of the plurality of information content files can be provided by software, firmware, and/or hardware already present and configured in the terminal. In some embodiments, the identifier data entries include decoded identifier data such as the alphanumeric sequences representing indicia data such as barcodes and symbols, SKU data, magnetic stripe data, RFID tag or RF payment data, biometric data, smart card data, and the like. In one embodiment, the file data entries are stored on a plurality of databases and the database connection information includes the information required to establish connections with the plurality of databases. In one embodiment, the terminal processes barcode data to extract a manufacture code that is used to determine which of the plurality of databases with which to establish a connection to retrieve the corresponding file data entry.

In various embodiments, the file data entries that are associated with the identifier data entries include references, such as file names, search strings, alphanumeric sequences such as indices, and the like. In some embodiments once a connection with the data storage device has been established using the data storage device connection information contained in the general file access information, the identifier data entries are used to locate a particular file on the data storage device either directly as with an index or via a query to a database. In some embodiments, the general file access information, the data storage device connection information, and/or the database connection information include protocols, software routines and/or supplemental information required to establish local and/or remote connections between communication devices such as computer systems. In one embodiment, the database is located on a remote computer system and the data storage device is located on the terminal. In one such embodiment, the data storage device is located on the terminal to minimize the network transmission load associated with transmitting the information content files such as image files. In one embodiment, information content files are updated at periods of network latency or at network off-peak hours. In additional embodiments as indicated above, the information content files and/or the file data entries can be stored on multiple computer systems. For example in one embodiment, the general file access information includes information for connecting to a plurality of data storage devices and each file data entry includes an index indicating one of the plurality of data storage devices as well as specific file identification information for locating a file on that data storage device.

Additionally the process 510 includes reading (step 522) an identifier on an identifier bearing item to generate identifier data. The identifier data is used by the terminal in generating (step 526) a file data entry request. In various embodiments, the identifier data can be decoded by the terminal or by a subsequent device in the chain of communication. The file data entry request is transmitted to the database based on at least the database connection information. The database or a computer system containing the database receives (step 530) and processes (step 534) the file data entry request. As part of the processing, at least one file data entry corresponding to the identifier data is located. In one embodiment, if the identifier data has not yet been decoded by the terminal or an intervening device, then the identifier data can be decoded as part of the processing of the file data entry request. The located file data entry is transmitted (step 538) from the database and/or the computing system associated with the database and is received (step 542) by the terminal. The terminal uses the file data entry to generate (step 546) an information content file request. The information content file request is transmitted (step 550) to the data storage device based at least on the general file access information. In various embodiments, the file data entry request and/or the information content file request can be HTTP requests and/or FTP requests. In another embodiment, the file data entry request is a proprietary or non-proprietary formatted message transmitted over a TCP/IP connection. In additional embodiments, the information content files include XML documents, image files, graphics files, video files, audio files, and/or text files and the like. Based on the information content file request, the data storage device locates (step 554) at least one information content file and transmits (step 558) it to the terminal. Elements of the at least one information content file, such as text, images, graphics, audio, video, and/or software code, are then used to present (step 562) information to a user/customer. In one embodiment, the at least one information content file is processed by the terminal prior to the presentation of information to the user/customer. In alternative embodiments, the information content file request can include a plurality of messages being transmitted to a plurality of data storage devices to retrieve a plurality of information content files. In these embodiments, the general file access information, as discussed above, provides the connection information for the plurality of data storage devices. In some embodiments as mentioned above and as described below in more detail, an entity separate from the sources of the identifier bearing items maintains some control over the information content files.

In an alternative embodiment, the database or a computer system containing the database is configured with the general file access information. In this embodiment, the database or the computer system containing the database sends the information content file request to the data storage device. As above, the information content file request identifies a particular information content file and is based on the general file access information and the file data entry. In this embodiment, the information content file request directs the data storage device to send the information content file to the terminal.

Figure 10:
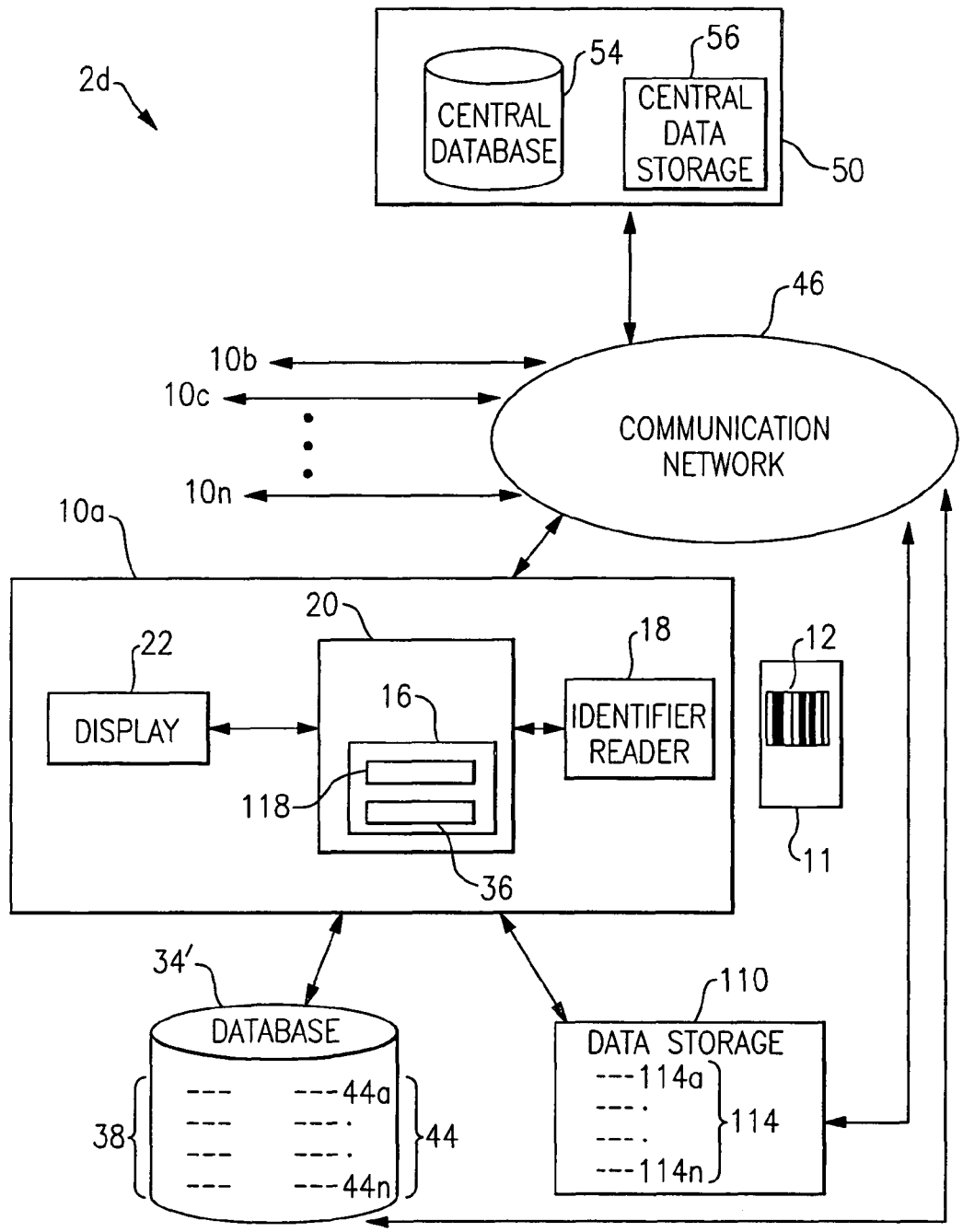
FIG. 10 is an alternative embodiment of an identifier associated information content storage and retrieval system constructed in accordance with the principles of the invention.

Referring to FIG. 10, a block diagram of a system 2*d* of an embodiment of the invention for storing and retrieving information content associated with an identifier is shown. As with respect to the system 2*c* of FIG. 7, the system 2*d* shown in FIG. 10 encompasses the embodiments 2*a* and 2*b* shown in FIGS. 1 and 4. The system 2*d* includes a plurality of terminals 10 that in one embodiment are as described above with respect to FIG. 7 except for changes in the configuration of the terminal 10 and the corresponding changes in operation described below. As indicated above, the terminals 10 include identifier readers 16 capable of generating identifier data that in one embodiment specifies according to an extrinsic standard at least a source of an identifier bearing item.

As shown in FIG. 10, the terminal 10*a* is in communication with a relational database 34'. In one embodiment, the relational database 34' contains a plurality of identifier data entries 38 and a plurality of file data entries 44*a*, . . . , 44*n* (generally 44). Each of the plurality of identifier data entries 38 is associated with at least one of the file data entries 44. In one embodiment, the identifier data entries 38 include decoded bar code data such as the alphanumeric sequences that correspond to, for example, UPC or EAN bar codes. In various embodiments as indicated above, the file data entries 44 contain information, such as file names, alphanumeric or symbolic file identifiers, search strings, indices and/or file path information and the like, that is used to locate specific information content files 114. In one embodiment, the file data entries 44 include numeric indices. For example in one embodiment, a file data entry is the number 5 that is used to access the information content image file 5.jpg.

Also as shown in FIG. 10, a plurality of information content files 114*a*, . . . , 114*n* (generally 114) are stored on a storage device 110 that is in communication with the terminal 10*a*. The data storage device 110 can be a network or computer specific memory device capable of storing and retrieving information. In various embodiments the data storage device can include a database or a computer file server such as a web HTTP server or a FTP server. In one embodiment, the information content files 114 are distributed on multiple data storage devices 110. In some embodiments, the data storage device 110 is configured to provide information in response to a telephony connection such as a modem or cellular connection. The formats of the information content files 114 are as described above. In one embodiment, the data storage device 110 is located on the terminal 10. In some embodiments as mentioned above and as described below in more detail, an entity separate from the sources of the identifier bearing items maintains some control over the information content files 114.

Also as shown in FIG. 10, the terminal 10*a*, the database 34', the data storage device 110, and the central location 50 are connected to a communications network 46 including at least one LAN, WAN, WWAN, traditional or cellular telephone network and/or satellite link. The central location contains a central database 54 and a central data storage device 56 and can reside on the remote computer 9 of FIGS. 1 and 4.

In alternative embodiments, the relational database 34' and/or the data storage device 110 is integrated into other elements of the system 2*d*. For example in the embodiments shown in FIGS. 1 and 4, the relational database 34' and/or the data storage device 110 could be present on the transaction terminal 14, the PC POS cash register 6, the portable data terminal 13, the store computer 7, and/or the remote computer 9. In an additional alternative embodiment, the terminal 10*a* is not directly connected to the relational database 34' and/or the data storage device 110 and communication between the devices occurs over the communications network 46.

Referring again to FIG. 10, a first region 36 of the memory 16 of the computing unit 20 is configured to store connection information for the relational database 34' and a second region 118 of the memory 16 is configured to store at least a portion of the general file access information. In various embodiments as discussed above, the general file access information is information that is employed in accessing the information content files 114 stored on one or more data storage devices 110. For example in one embodiment, the general file access information includes the network address of the data storage device 110 and a file path portion that is common to all of the information content files 114. In this embodiment, the portion of the file path that is specific to a particular information content file 114 is stored as one of the file data entries 44. For example in one embodiment, the file data entry 44*a* provides the specific file path information for the information content file 114*a*. In another embodiment, the absolute path to an information content file 114 is achieved through the combination of the general file access information providing the address of the data storage device 110 and the file data entry 44 providing the path to the information content file 114 relative to the data storage device 110. In a further embodiment, the general file access information provides the address of the data storage device 110 and at least a portion of the path to an information content file 114. In this embodiment, the file data entries 44 include any remaining path information including the name of the information content file 114.

As indicated above according to the principles of the invention, different divisions of the complete path to an information content file 114 are possible and can range from the general file access information specifying only data storage device location information to the general file access information specifying the complete path for each of the information content files 114 except for the file names themselves. For example consider a path for an information content file 114 given by:

"n:\information_content files\image_files\product_xyz.jpg".

The general file access information could be:
(1) "n:\",
(2) "n:\information_content files\", or
(3) "n:\information_content files\image_files\".

The corresponding file data entry 44 for the various versions of the general file access information listed above would be:
(1) "information_content files\image_files\product_xyz.jpg",
(2) "\image_files\product_xyz.jpg", or
(3) "product_xyz.jpg."

In example (3), the information content files 114 are only image files.

In an additional embodiment, the general file access information and/or the database connection information also includes software routines and/or protocols that are used in accessing the data storage device 110 and/or the database 34'. In another embodiment, the general file access information and/or the database connection information includes elements necessary to establish a point-to-point connection between the terminal 10a and the database 34' and/or the data storage device 110. For example in one such embodiment, the database connection information includes the cellular phone or data connection information necessary for the terminal to establish a cellular network connection with a computer system containing the database.

In additional alternative embodiments, the general file access information includes multiple components each specifying the location of one of a plurality of data storage devices 110. In this embodiment, each component for each data storage device 110 can also include a specification of the file path that is common to the information content files 114 located on the particular data storage device 110. Further in this embodiment, the file data entries 44 specify the file path information not provided by the corresponding component of the general file access information.

Figure 11:
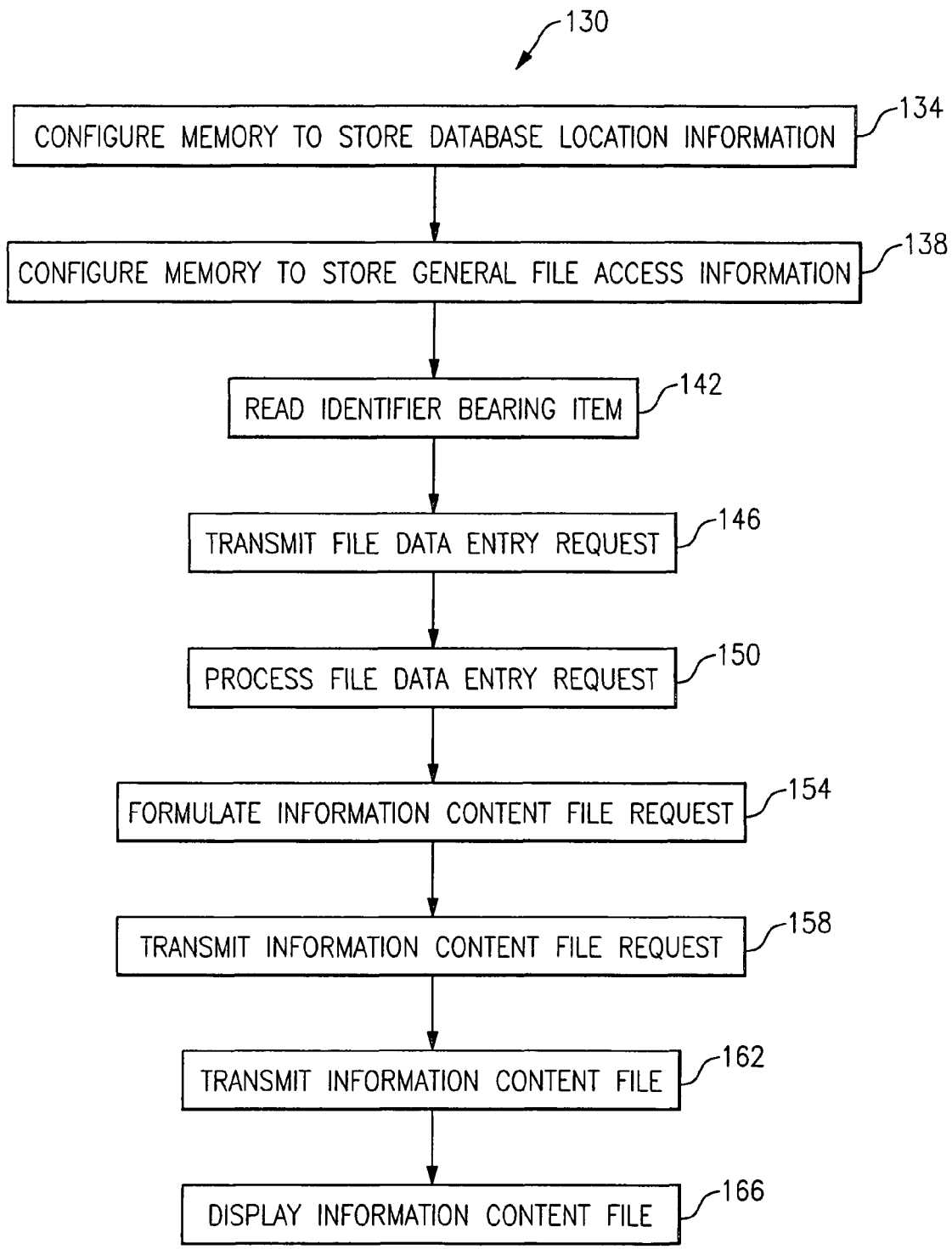
FIG. 11 is a flow-chart illustrating a process for employing the system of FIG. 10.

FIG. 11 shows one embodiment of a process 130 for retrieving from the data storage device 110 an information content file 114 associated with an identifier on an identifier bearing item. In one embodiment, the process 130 is employed with the system 2d of FIG. 10. The process 130 includes configuring (step 134) a first region 36 of memory 16 with information related to the location, such as the network address, of the relational database 34'. The process 130 also includes configuring (step 138) a second region of memory 16 with at least a portion of the general file access information, such as a network address. In various embodiments, additional general file access information can be provided by configuring software, firmware, and/or hardware in the terminal. To initiate the retrieval and display of an information content file 114, an identifier bearing item is read (step 142). Once the identifier has been read, the terminal 10 extracts from memory 16 the database 34' location information. Next, the terminal 10 transmits (step 146) a request for a file data entry 44 to the database 34'. In one embodiment, the request includes at least the identifier and is transmitted based on at least the configured database location information. The database processes (step 150) the request which includes identifying the identifier data entry 38 corresponding to the identifier and extracting at least one associated file data entry 44. Once the terminal 10 has received the at least one file data entry 44 from the database 34', the terminal formulates (step 154) an information content file request based on at least the general file access information and the at least one file data entry 44. The information content file request is then transmitted (step 158) to the data storage device. Once located by the data storage device 110, at least one information content file 114 is transmitted (step 162) to the terminal 10 for presentation (step 166) on the display 22. The display of the information content file 114 can involve modification and/or processing of the information content file. In one embodiment, the process 130 also includes decoding the identifier either by the terminal or another device, such as a computer system containing the database, employed as part of the process 130.

In various embodiments, specifying the location of an information content file 114 can include the use of any available computer file identification or addressing scheme that can be used to uniquely identify a particular file on a specific computing device. For example in one embodiment, the general file access information can be the IP address of a networked computer and the file data entries 44 can be the paths to the specific files on the particular network computer. In one illustrative example, the location 36 of the relational database 34' is the IP address of a web server whose DNS identifier is store.computer1. In this illustrative example the file data entry request is a HTTP request associated with the URL http://store.computer1:80?GET=7341600015 where the number 7341600015 is an alphanumeric sequence for a decoded bar code. The web server on the store.computer1 in this illustrative example uses the relational database 34' to process the request and locate the file data entry 44 corresponding to the indicia data entry 38 for the alphanumeric sequence 7341600015.

In addition in this illustrative example, one of the information content files 114 is the image file product_xyz.jpg. The corresponding file data entry 44 includes the name and path of this information content file 114 and is specified as information_content files/image_files/product_xyz.jpg. Further in this illustrative example, the information content file 114 product_xyz.jpg is stored on a data storage device 110 whose DNS identifier is store.computer2. The data storage device 110 in this illustrative example includes a FTP server. In other embodiments, the operations of the store.computer1 and the store.computer2 are combined on a single computer system. In the current illustrative example, the process of performing an information content file request involves establishing a FTP session with the store.computer2 by, for example, executing the FTP command ftp store.computer2 and performing the required log on procedures. Once a FTP session is established with the store.computer2, extracting the image file product_xyz.jpg is achieved by executing the FTP command get information_content files/image_files/product_xyz.jpg In the current illustrative example as indicated above, the general file access information includes the address of the data storage device 110, i.e., the DNS identifier store.computer2, and the file data entries 44 include the name and paths for the information content files 114.

In an alternative illustrative embodiment, the general file access information includes both the address of the data storage device 110 and the file path that is common to all of the information content files 114, e.g., the path information_content files/image files. In this alternative illustrative embodiment, the file data entries 44 includes the names of the information content files 114, e.g., product_xyz.jpg, but not the path to the specific files.

In alternative embodiments, the file data entry requests and the information content file requests can either or both be HTTP requests, FTP requests, or other non-proprietary or proprietary methods for accessing files from a database or a remote computer system. For example in one embodiment, the file data entry requests are FTP requests and the information content file requests are HTTP requests. In an additional alternative embodiment, an information content file HTTP request identifies a particular information content file by including information regarding the path to the information content file. For example an information content request according to this embodiment could be of the form > http://store.computer2:80/information_contentfiles/image_files/product_xyz.jpg In another alternative embodiment, an information content file HTTP request identifies a particular information content file by including file identification information such as the file's name. This information is used by software routines, such as search routines, to locate the information content file. For example an information content request according to this embodiment could be of the form > http://store.computer2:80?GET=product_xyz.jpg As indicated above as part of facilitating HTTP, FTP or alternative formatted requests, information pertaining to the locations of the database used for the file data entry requests and information pertaining to the location of the data storage device used for the information content file requests are configured in the terminal's memory. Further, specific information content file location information is provided as part of the response to the file data entry requests.

In one embodiment, promotional materials are presented to a customer in response to the reading of an identifier on an identifier bearing item. For example at a point-of-sale location as items are scanned by a cash register, image files such as JPEG files can be presented to a customer. In one embodiment, each product has a unique image file that presents promotional and/or additional information to the customer. In another embodiment, the same image is presented to a customer for a group of products. For example in one embodiment, all of the products manufactured by a particular company would have a common image presented to a customer when any of the products were scanned. In another embodiment, the promotional materials presented to a customer are related to cross selling between products. For example in one embodiment, promotions for items that are located at or near the point-of-sale location and related to an item being purchased are presented to a shopper. For example, a customer purchasing mouth wash could be presented with a promotion for breath mints and a customer purchasing a beverage could be presented with a promotion for ice.

In another embodiment, financial transaction information is provided to a customer in response to the reading of an identifier. For example in one embodiment, a customer has a transaction card such as a credit card, a debit card, an ATM card, a store specific card, a payment token or the like that includes customer data available in any one of a plurality of data formats such as optical, RF, magnetic stripe, chip based data as on a smart card, or the like. In one embodiment, the transaction card contains information related to potentially multiple accounts held by the customer. As part of purchasing goods in one embodiment, the customer places the RF enabled transaction card in close proximity to a transaction terminal. The transaction terminal interrogates the RF enabled transaction card extracting a card identifier and/or information related to the potentially multiple accounts.

In one embodiment, the card identifier and/or account information indicates the card type such as a VISA™ card issued by a particular bank. The transaction terminal then includes the card identifier and/or account information in a request to a database whose address is configured in the memory of the transaction terminal. In one embodiment, the database is located on the transaction terminal. In other embodiments, the database is located on a PC based cash register or a remote computer either directly or indirectly attached to the transaction terminal. In response to the request, the transaction terminal is provided with an information content file that is associated with the card identifier and/or account information. In one embodiment the database is maintained by a third part financial institution and contains information content files containing financial information related to a plurality of customer accounts. The financial information can include, for example, the status of a customer's account such as a current limit and/or a current balance.

In another embodiment, the transaction card is a merchant card such as a customer loyalty or frequent shopper card. As part of purchasing items, a customer presents his or her transaction card. Identifier information from the transaction card is used to access a customer profile. In various embodiments, the customer profile includes information regarding a customer's buying preferences, level of patronage such as amount spent during a specified period, past purchases, preferred payment method, and the like. Based on the customer profile, the shopper can be presented with personalized promotions. For example if the customer profile indicated that a customer recently purchased a DVD player, the personalized promotion could suggest the discounted purchase of a particular movie DVD that was on display adjacent to a point-of-sale location. In additional embodiments, the particular movie DVDs promoted could be based on the customer's past DVD movie buying preferences. In another embodiment, the information presented to a customer is based on a plurality of identifiers. In one such embodiment a product identifier and a customer identifier are used in determining the information content file(s) that are retrieved and presented. In one such embodiment for example, a customer that has provided his or her customer loyalty card is presented with information indicating that he or she has been charged a discounted price for a particular item due to the customer's patronage. In another such embodiment for example, the promotional materials presented are based on the purchase of an item with an available warranty and a customer's profile that indicates that he or she has purchased warranties previously. In a further embodiment, the product associated and potentially interactive information requested by the terminal and presented to the customer could include an offer for the sale of goods and/or services made available to the customer at a latter time by, for example, shipping the goods to the customer. In one such embodiment where a customer is buying a DVD player, the customer is presented with promotional materials for the purchase of DVD movies shipped independently to the customer. In an alternative embodiment, the customer could be offered goods and/or services indirectly related to the item being purchased. For example when a DVD is being purchased, the customer could be offered a discounted or a trial membership in a DVD renting program such as the service offered by NetFlix™ of 970 University Avenue, Los Gatos, Calif.

In an alternative embodiment, a shopper is provided with a portable transaction terminal or a portable data terminal. In one embodiment the portable transaction or data terminal is attached to a customer shopping device such as a shopping cart. In another embodiment to initiate the personalized and/or enhanced shopping operation of the portable transaction or data terminal, a shopper provides customer identification information to the portable transaction or data terminal by way of the transaction card or payment token. In an alternative embodiment, the customer identification information can be provided by a customer entering a personal identification number (PIN) such as a specified alphanumeric sequence into the device. In another embodiment, the portable terminal is used to promote brands associated with a store's product. For example if a customer using a portable terminal requests information about a particular brand name product, promotional material including a lower price can also be presented about a related store product.

The customer identification information is used to extract a customer profile including, for example, a list of the customer's recent purchases. Based on the customer profile, the customer can be provided with personally tailored promotions. In another embodiment, a customer's own device, such as a customer's cellular phone or personal data assistant, can be used to provide the supplemental shopping information. For example upon entering a store a customer could initiate communication between his or her device and, for example, a wireless store network, such as a 802.11b network. Based on this communication, the customer could be identified to the store and provided with the personally tailored promotions.

In an alternative embodiment, a customer is provided with personally tailored promotions by way of a personalized shopping flier containing specials based on the customer's profile. The personalized shopping flier can be provided by a display terminal located at an entrance or at a price check or information kiosk located in the store. In one embodiment upon entering the store, a customer places a RFID enabled transaction card or key fob in close proximity to the display terminal. The display terminal extracts customer identification information from the transaction card and uses the information to develop and print the personalized list of specials or sale items. For example, if the customer's profile indicates that he or she recently purchased golf clubs, the personalized list of specials could include a discount for the purchase of golf balls. In addition in one embodiment, the list of specials can include directions to and/or the location of the discounted items.

In a further embodiment, an information content file is an XML document that is used to format and present to a customer financial information related to a transaction including information related to potentially multiple accounts available to the customer. For example in one embodiment, the XML document determines or specifies promotions or terms that are available to a customer for each of a set of available accounts. For example the customer could be presented with information that purchasing the goods with an account associated with the store selling the goods will result in an automatic rebate being issued and credited to the customer's store based account. In operation in one embodiment as part of the execution of software code contained in the XML document, information pertaining to the potentially multiple accounts is accessed from a local or a remote computer, such as a computer maintained by a third party financial institution.

In another illustrative example, a portable data terminal is used to provide supplemental information regarding an identifier bearing item located at a remote site. In one embodiment, a portable data terminal employed by a service technician is enabled with an identifier reading device. In a specific such embodiment, the identifier reading device is a RFID read/write device that can interrogate RFID tags to extract data stored therein and can transmit RF signals that cause circuits in the RFID tag to store specified information. According to one embodiment of the invention, a service technician can access service or repair records by exploiting information stored in an RFID tag attached to a device requiring repair or servicing. In one illustrative example a service technician travels to a commercial or residential location to service an item such as an air condition or heating unit. With the portable data terminal, a service technician reads a RFID tag attached to the unit. The portable data terminal then establishes a cellular data connection with a remote computer and transmits identification information extracted from the RFID tag. In response to the identifier information, the portable data terminal is either directly provided with service records or is provided with a file data entry that the portable data terminal uses to contact one or more additional databases to request the service record. With the cellular connection and the identification information, the service technician can also request addition materials such as technical references or bulletins required to complete the servicing. Once finished, the service technician can use the identifier and the cellular connection to update the service record for the device. In one embodiment, some information such as the date of the current servicing or an identifier for the type of repair and/or service person is stored directly in the RFID tag at the conclusion of the servicing. In alternative embodiments, this information is added to the service records that are stored on the remote databases or remote data storage devices.

Figure 12:
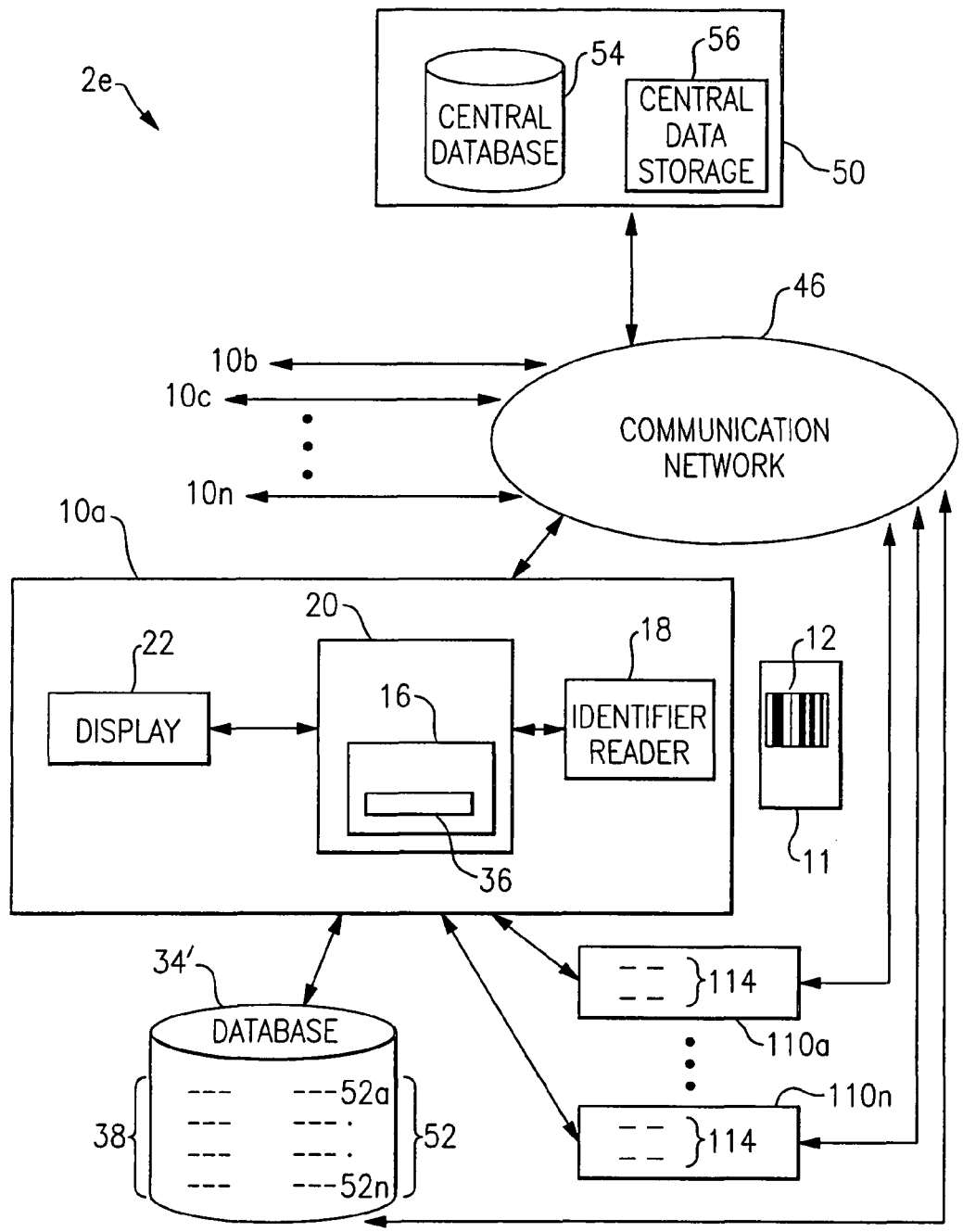
FIG. 12 is an additional alternative embodiment of an identifier associated information content storage and retrieval system constructed in accordance with the principles of the invention.

Referring to FIG. 12, a block diagram of a system 2e of an embodiment for storing and retrieving information content associated with an identifier is shown. As with respect to the system 2c of FIG. 7 and 2d of FIG. 10, the system 2e shown in FIG. 12 encompasses the embodiments 2a and 2b shown in FIGS. 1 and 4. The system 2e includes a plurality of terminals 10 that in one embodiment are as described above with respect to FIGS. 7 and 10 except for configuration changes and the operational differences described below. As indicated above, the terminals 10 include identifier readers 16 capable of generating identifier data that in one embodiment specifies according to an extrinsic standard at least a source of an identifier bearing item.

As shown in FIG. 12, the terminal 10a is in communication with a plurality of data storage devices 110a, ..., 110n each of which in one embodiment contain a plurality of information content files 114. The data storage devices 110 can be network or computer specific memory devices or computer file servers such as web HTTP servers or FTP servers as discussed above. In alternative embodiments, the data storage devices 110 are configured to provide information in response to a telephony connection such as a modem or cellular connection. The formats of the information content files 114 can be as described above with respect to FIG. 1. In one embodiment, at least one of the data storage devices 110 is located on the terminal. In some embodiments as mentioned above and as described below in more detail, an entity separate from the sources of the identifier bearing items maintains some control over the information content files 114.

Also as shown in FIG. 12, the terminal is in communication with a relational database 34'. In one embodiment, the relational database 34' contains a plurality of identifier data entries 38 and a plurality of redirection entries 52a, ..., 52n (generally 52). In an alternative embodiment, the plurality of redirection entries 52 are distributed over a plurality of databases 34'. Each of the plurality of identifier data entries 38 is associated with at least one of the redirection entries 52. In one embodiment, the identifier data entries 38 are as described above. In various embodiments, the redirection entries 52 contain information used by the terminal 10a to establish communication with the data storage devices 110 and to extract at least one of the information content files 114. For example in one embodiment, each of the redirection entries 52 contains the network address of one of the data storage devices 110 and the path to an information content file 114. In alternative embodiments, some or all of the redirection entries 53 can specify a plurality of data storage devices 110 and/or a plurality of paths to a plurality information content files 114.

Also as shown in FIG. 12, the terminal 10a, the database 34', the data storage devices 110 and the central location 50 are connected to a communications network 46 as described above. Also as described above, the central location 50 contains a central database 54 and a central data storage device 56 that can reside, in one embodiment, on the remote computer 9 of FIGS. 1 and 4.

In alternative embodiments, the relational database 34' and/or the data storage devices 110 are integrated in other elements of the system 2e. For example in the embodiments shown in FIGS. 1 and 4, the relational database 34' and/or the data storage devices 110 could be present on the transaction terminal 14, the PC POS cash register 6, the portable data terminal 13, the store computer 7, and/or the remote computer 9. In an additional alternative embodiment, the terminals 10a is not directly connected to the relational database 34' and/or the data storage devices 110 and communication between the devices 10a, 34', 110 occurs over the communication network 46. In various embodiments as indicated above, the terminal 10a can be a transaction terminal, an information and/or transaction kiosk, a portable data terminal, a personal data assistant (PDA), a cash register, a point-of-sale location, a cellular phone, a self-checkout terminal, or an alternative computing device of an arbitrary form factor that is configured to access information content associated with an identifier. In various embodiments, the set of terminals 10 in the system 2e can include terminals 10 with different form factors.

Figure 13:
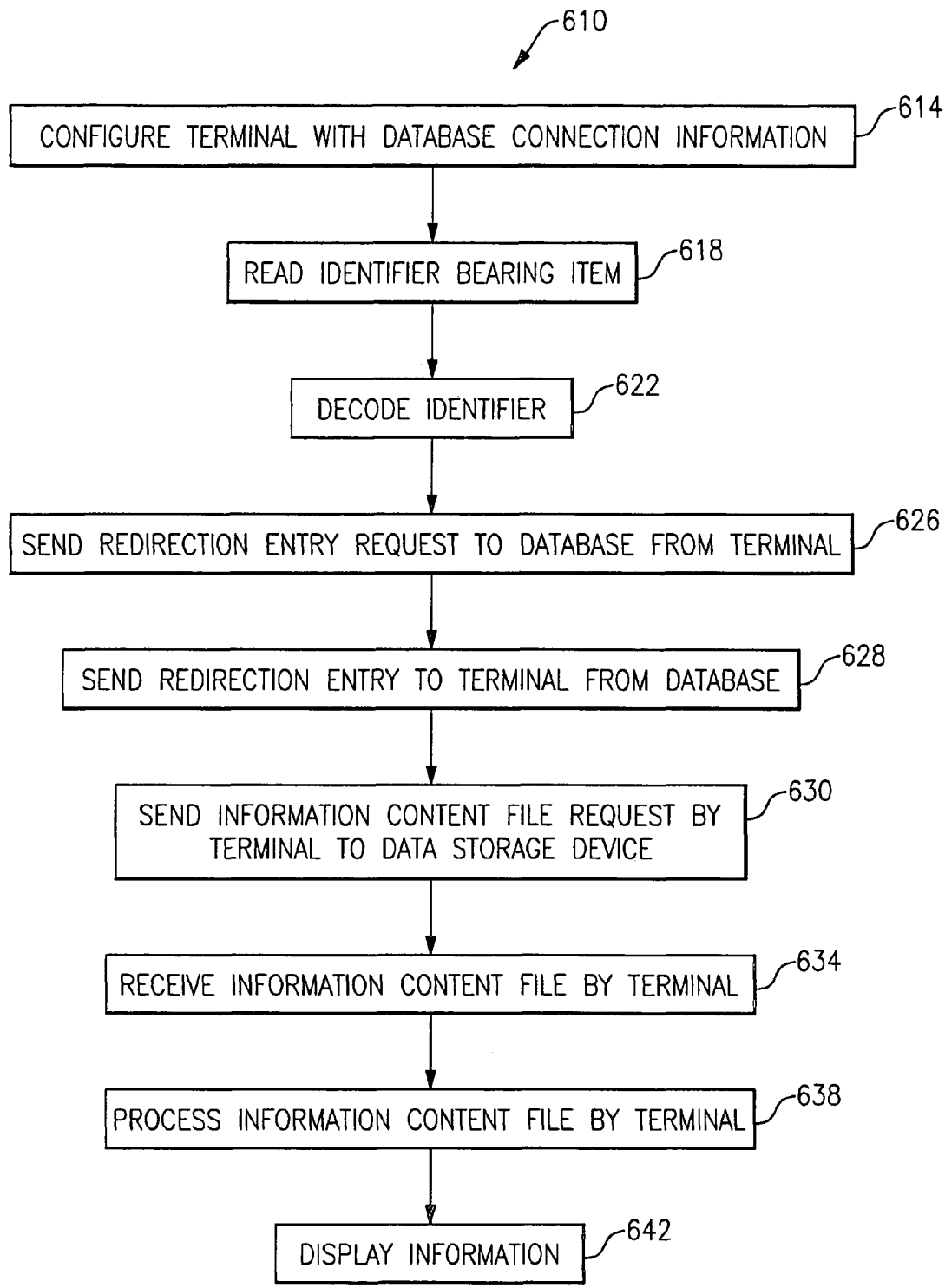
FIG. 13 is a flow-chart illustrating a process for employing the system of FIG. 12.

As shown in FIG. 13, a process 610 for retrieving and displaying information related to an identifier bearing item is shown. The process 610 includes configuring (step 614) the terminal 10 to store database connection information. In one embodiment, the configuring includes configuring hardware, software, and or/firmware. In various embodiments, the software and/or firmware can be resident in a region 36 of the computer memory 16. In one embodiment, the database connection information includes a network address such as an IP address. In another embodiment, the database connection information also includes software routines and/or protocols that are used to access the database 34'. In a further embodiment, the database connection information includes elements necessary to establish communication over a variety of links such as telephone, computer, and/or satellite networks or a computer bus. In one embodiment, communication with the database 34' includes formatted messages transmitted over a wireless IP or wired TCP/IP connection.

To initiate the presentation of an information content file 114 related to an identifier bearing item, an identifier is read (step 618) from the identifier bearing item to generate identifier data. In one embodiment as mentioned above, the identifier data specifies according to an extrinsic standard at least the source of the identifier bearing item. In one embodiment, reading an identifier includes scanning a barcode on a consumer product at a point-of-sale terminal location. In other embodiments, the reading of an identifier can include the reading of a RFID tag, a RF payment token, a magnetic stripe card, biometric data, a smart card and the like. In another embodiment, the reader further decodes (step 622) the identifier to generate decoded identifier data that is subsequently used as an alternative to the identifier data. Using the identifier data and the database connection information, the terminal 10a sends (step 626) a request to the database 34' for the redirection entry 52 associated with the corresponding identifier data entry 38. In response, the database 34' sends (step 628) the redirection entry 52 to the terminal 10. The redirection entry 52 is then used by the terminal to send an information content file request (step 630) to a data storage device 110. In one embodiment, the redirection entry 52 includes the network address of one of the data storage devices 110 and an index used to extract at least one information content file 114 from the specified data storage device 110. In various embodiments, the requests can be HTTP or FTP requests or a message formatted according to a proprietary or non-proprietary protocol. In another embodiment, the database 34' sends the information content file request directly to one of the data storage devices 110. In this embodiment, the data storage device 110 is directed by the database 34' or the computer system associated with the database 34' to send the information content file 114 to the terminal. In various embodiments, connection information for the one or more data storage devices 110 to which an information content file request can be sent is provided by the redirection entries 52 or is configured in the database 34' or the computer system associated with the database 34'. In some embodiments, the information content file request can include messages being transmitted to a plurality of data storage devices 110 to retrieve a plurality of information content files 114. Once the one or more information content files 114 have been received (step 634) and processed (step 638) by the terminal 10a, the corresponding information is displayed (step 642) to a user or customer. In some embodiments as mentioned above and as described below in more detail, an entity separate from the sources of the identifier bearing items maintains some control over the information content files 114.

In various such embodiments, the entity is a content management entity. According to one such embodiment, the content management entity maintains and/or updates the contents of the database(s) 34, 34' and/or the data storage device(s) 110 that enable product information and promotions to be displayed to a user/customer. As described above, the database(s) 34, 34' and data storage device(s) 110 include information content files, such as image files, and file data entries, such as indices. In one embodiment, a function of the content management entity is to ensure that the product information and promotions contain acceptable content and conform to required formats such as may be required, for example, by a display device presenting promotional materials. In some embodiments, the conformity aspect is facilitated by using templates for the presentation of material. In one such embodiment, companies desiring to have their information content associated with a product or group of products insert their information content into the templates. Alternatively, the companies can provide the content that is packaged into the proper format by the content management entity. In one embodiment, the content management entity provides guidelines for the information content files. In another embodiment, the content management entity develops the information content files, possibility in response to information provided by companies desiring to have their information content associated with a product or group of products. In one embodiment, a function of the content management entity is to maintain copies of the information content files that are stable in time. As described above in various embodiments, the content management entity maintains some control over the information content files. As discussed above, the control can include maintaining, developing, and/or establishing guidelines for the information content files. In some embodiments, the operation of the content management entity is located at or associated with the central location 50 described above.

Another function of the content management entity in one embodiment is to periodically distribute updated versions of the content. This function can additionally include providing any software and/or hardware necessary for the updates to be integrated into the systems described. A further function of the content management entity in one embodiment is to develop different content versions. For example in one embodiment, the content, such as the specific information content files, varies depending on the location where the content is to be presented. In one embodiment, a store identifier determines the content version that will be received and presented to customers. In various embodiments the content version provided to a store can vary depending on the store itself, the local and/or regional geographic location of the store, the store's immediate competitive environment and the like.

In exchange for providing at least these functions, the content management entity in one embodiment can charge fees to the companies that desire to have their information associated with particular products or groups of products. These fees could be based on the inclusion of the information, the complexity and/or size of the information such as whether the content includes images, graphics, video and/or interactive components in addition to text, and/or the number of times that the information is accessed by user/customers. In additional embodiments, price differentiation in fees is based on the nature of the goods or services with which the information is associated. For example, having information associated with goods or services provided by large companies such as American Express™ or General Foods™ could cost a different amount than having information associated with the goods or services associated with a local or regional company. In another embodiment, the fees for associating information with a good or service are dependent on the nature of the good or service in question. For example in one embodiment, the fee for having information presented to a customer purchasing a computer or a DVD player is different than the fee for having information presented to a customer purchasing a basic food item. In another embodiment, the fee is based on whether the information is associated with only a single item or a class of items. For example the fee for having information associated with any power tool purchased could be different than the fee for having information associated with a Black&Decker™ power tool which might be different from the fee for a particular model of a Black&Decker™ power tool. In a further embodiment, companies are provided with a fee option that allows them to exclude the provision of information by other companies such as competitors.

In one embodiment of the invention, the content management entity is able to control and/or modify the information presented by a terminal through the database and/or data storage device connection information that is stored on the terminal. In one embodiment different versions of the information content files are stored on different network computers or at different locations on a particular computer. According to this embodiment, the version of the information content files displayed by a terminal is determined by the database and/or data storage device network address configured in the terminal. In one embodiment, the terminal can be configured to periodically check for updates or modifications to the configured connection information. In one embodiment in which the information content files are stored on a database on a network computer that is accessed by a plurality of terminals, modification of the information content files in the database results in different information being presented by the plurality of terminals. In this embodiment, interaction with the terminals is not required to achieve modified information being presented by the plurality of terminals.

In other embodiments, some or all of the functions described above in connection with the content management entity can be performed by alternative or multiple entities. For example in one embodiment, the functions of the content management entity are performed by two or more entities each of which focuses on specific tasks. In one such embodiment, one entity focuses on the development of the information content files and another entity focuses on the maintenance of the information content files. In another such embodiment, the information content files are divided into categories, such as categories based on the underlying type of good (e.g., food items versus electronic items) and each category is developed and/or maintained by a different entity. In another embodiment, some or all of the functions of the content management entity are performed by an industry association. In one such embodiment, the industry association is formed by companies providing goods and/or services and desiring to develop and standardize the presentation of information associated with goods and/or services. In another such embodiment, the industry association is formed by business entities, such as retail establishments, that maintain terminals on which information content files are displayed.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, EEPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and/or software for another implementation of the equivalent functionality using a different one of hardware, firmware and/or software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and/or software implementations of portions or segments of the transfer function, is contemplated herein.

While the present invention has been particularly shown and described with reference to the preferred mode as illustrated in the drawings, it will be understood by one skilled in the art that various changes in detail may be effected therein without departing from the spirit and scope of the invention. In particular the invention is not dependent on the specific terminal device employed, such as a portable data terminal, a personal data assistant, a transaction terminal, a cellular phone, a cash register, or a self-checkout terminal, used to retrieve information content associated with an identifier. For example any of the examples employing one of the terminal devices described above could equally well have been constructed in an alternative embodiment with one of the other devices. In addition any of the appropriate the embodiments and examples described with respect to FIGS. 7 and 8, FIG. 9, FIGS. 10 and 11, or FIGS. 12 and 13 could equally well have been described in corresponding alternative embodiments with respect to one of the other systems or methods. Further, any of the examples using FTP or HTTP requests could equally well have been achieved by employing the other protocol or a suitable alternative communications request message.

We claim:

1. A method of storing and retrieving information content related to an identifier bearing item, the method comprising:
   configuring a terminal with general file access information, the general file access information including at least data storage device connection information, the data storage device containing a plurality of information content files;
   configuring the terminal with database connection information, the database containing a plurality of identifier data entries and a plurality of file data entries, each of the plurality of identifier data entries associated with at least one of the file data entries, each of the file data entries when combined with the general file access information capable of being used to access at least one of the plurality of information content files;
   reading an identifier on the identifier bearing item to generate identifier data;
   transmitting a file data entry request to the database from the terminal, the file data entry request being transmitted based on at least the stored database location information and including at least the identifier data;
   receiving from the database by the terminal a file data entry; and
   formulating by the terminal an information content file request, the information content file request based on at least the general file access information and the file data entry.

2. The method according to claim 1 wherein the information content file request is a file transfer protocol request.

3. The method according to claim 1 wherein the information content file request is a hypertext transfer protocol request.

4. The method according to claim 1 wherein the file data entry request is a file transfer protocol request.

5. The method according to claim 1 wherein the file data entry request is a hypertext transfer protocol request.

6. The method according to claim 1 wherein the terminal is a transaction terminal.

7. The method according to claim 1 wherein the terminal is a portable data terminal.

8. The method according to claim 1 wherein the terminal is an information kiosk.

9. The method according to claim 1 wherein the terminal is a cash register.

10. The method according to claim 1 wherein the terminal is self-checkout terminal.

11. The method according to claim 1 wherein the information content files are image files.

12. The method according to claim 1 wherein the information content files are extensible mark-up language files.

13. The method according to claim 1 wherein the information content files are text files.

14. The method according to claim 1 wherein the data storage device connection information comprises a network address for the data storage device.

15. The method according to claim 1 wherein the data storage device connection information comprises telephony connection information for the data storage device.

16. The method according to claim 1 wherein the data storage device is located on the terminal.

17. The method according to claim 1 wherein the identifier is represented by a barcode.

18. The method according to claim 1 wherein the identifier is stored in radio frequency identification tag.

19. The method according to claim 1 further comprising decoding the identifier.

20. The method according to claim 1 wherein the general file access information specifies the location of the data storage device and the file data entries specify file paths on the data storage device.

21. The method according to claim 1 wherein the general file access information specifies the location of the data storage device and a first file path portion and the file data entries specify second file path portions, the second file path portions including file names.

22. The method according to claim 1 wherein the file data entries are file names.

23. A system for storing and retrieving information content related to an identifier bearing item, the system comprising:
   a reader capable of reading an identifier on the identifier bearing item to generate identifier data;
   a data storage device containing a plurality of information content files;
   a terminal configured to store general file access information and database connection information, the general file access information including at least data storage device connection information; and
   a database containing a plurality of identifier data entries and a plurality of file data entries, each of the plurality of identifier data entries associated with at least one of the file data entries,
   wherein an information content file request transmitted by the terminal to the data storage device is based on at least the general file access information and on one of the file data entries, the one of the file data entries being received in response to a file data entry request transmitted by the terminal to the database.

24. The system according to claim 23 wherein the file data entry request is based on at least the identifier data and is transmitted based on at least database connection information stored in the terminal.

25. The system according to claim 23 wherein the information content file request is a file transfer protocol request.

26. The system according to claim 23 wherein the information content file request is a hypertext transfer protocol request.

27. The system according to claim 23 wherein the general file access information specifies a network address of the data storage device and each of the file data entries provide information identifying one of the information content files.

28. The system according to claim 23 wherein the terminal is a transaction terminal.

29. The system according to claim 23 wherein the terminal is a portable data terminal.

30. The system according to claim 23 wherein the terminal is a cash register.

31. The system according to claim 23 wherein the terminal is an information kiosk.

32. The system according to claim 23 wherein the terminal is self-checkout terminal.

33. The system according to claim 23 wherein the information content files include image files.

34. The system according to claim 23 wherein the information content files include extensible mark-up language files.

35. The system according to claim 23 wherein the information content files include text files.

36. The system according to claim 23 wherein the reader is further capable of decoding the identifier.

37. The system according to claim 23 wherein the general file access information specifies the location of the data storage device and the file data entries specify file paths on the data storage device.

38. The system according to claim 23 wherein the general file access information specifies the location of the data storage device and a first file path portion and the file data entries specify second file path portions, the second file path portions including file names.

39. The system according to claim 23 wherein the file data entries are file names.

40. A system for storing and retrieving information content related to an identifier bearing item, the system comprising:
   a reader capable of reading an identifier on the identifier bearing item to generate identifier data, the identifier data specifying at least a source of the identifier bearing item;
   a database containing a plurality of identifier data entries, each of the identifier data entries associated with a redirection entry;
   a terminal in communication with the reader, the terminal configured with database connection information;
   a data storage device containing a plurality of information content files, at least one of the plurality of information content files related to the identifier bearing item;
   a communications network in communication with the terminal, the database and the data storage device; and
   an entity separate from the source of the identifier bearing item, the entity maintaining some control over the at least one of the plurality of information content files related to the identifier bearing item,
   wherein the terminal establishes communication with the data storage device and requests at least one of the plurality of information content files related to the identifier bearing item based on the redirection entry associated with the identifier bearing item, the redirection entry being received in response to a request transmitted by the terminal to the database.

41. The system according to claim 40 wherein the source of the identifier bearing item is a manufacturer of the identifier bearing item.

42. The system according to claim 40 wherein the source of the identifier bearing item is an importer of the identifier bearing item.

43. The system according to claim 40 wherein the some control includes maintaining the information content files.

44. The system according to claim 40 wherein the some control comprises developing guidelines for the information content files.

45. The system according to claim 40 wherein the some control comprises developing at least some of the content of the information content files.

46. The system according to claim 40 wherein the entity is a retail establishment containing the terminal.

47. The system according to claim 40 wherein the entity is a content management entity.

48. The system according to claim 40 further comprising a plurality of entities separate from a plurality of sources for a corresponding plurality of identifier bearing items, each of the plurality of entities maintaining some control over some of the information content files.

49. A method for storing and retrieving information content related to an identifier bearing item, the method comprising:
   configuring a terminal with database connection information, the database containing a plurality of identifier data entries, each of the identifier data entries associated with a redirection entry;
   reading an identifier on the identifier bearing item to generate identifier data, the identifier data specifying at least a source of the identifier bearing item;
   transmitting a redirection request to the database from the terminal, the redirection request being transmitted based on at least the stored database location information and including at least the identifier data;
   receiving by the terminal from the database a redirection entry;
   transmitting an information content file request by the terminal to one of a plurality of data storage devices based on at least the redirection entry, the information content file request identifying at least one of a plurality of information content files stored on the one of the plurality of data storage devices, the at least one of the plurality of information content files related to the identifier bearing item; and
   receiving by the terminal from the one of the plurality of data storage devices the at least one of the plurality of information content files,
   wherein an entity separate from the source of the identifier bearing item maintains some control over the at least one of the plurality of information content files related to the identifier bearing item.

50. The method according to claim 49 wherein the source of the identifier bearing item is a manufacturer of the identifier bearing item.

51. The method according to claim 49 wherein the source of the identifier bearing item is an importer of the identifier bearing item.

52. The method according to claim 49 wherein the some control includes maintaining the information content files.

53. The method according to claim 49 wherein the some control comprises developing guidelines for the information content files.

54. The method according to claim 49 wherein the some control comprises developing at least some of the content of the information content files.

55. The method according to claim 49 wherein the entity is a retail establishment containing the terminal.

56. The method according to claim 49 wherein the entity is a content management entity.

57. The method according to claim 49 further comprising a plurality of entities separate from a plurality of sources for a corresponding plurality of identifier bearing items, each of the plurality of entities maintaining some control over some of the information content files.

* * * * *